(12) United States Patent
Rainville et al.

(10) Patent No.: US 12,216,034 B2
(45) Date of Patent: Feb. 4, 2025

(54) METHODS TO INCREASE SENSITIVITY OF LC/MS ANALYSIS

(71) Applicant: Waters Technologies Corporation, Milford, MA (US)

(72) Inventors: Paul Rainville, Princeton, MA (US); Kerri Smith, Marlborough, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 18/604,005

(22) Filed: Mar. 13, 2024

(65) Prior Publication Data

US 2024/0219275 A1 Jul. 4, 2024

Related U.S. Application Data

(63) Continuation of application No. 17/990,029, filed on Nov. 18, 2022, now Pat. No. 11,959,842, which is a (Continued)

(51) Int. Cl.
*G01N 30/72* (2006.01)
*G01N 1/40* (2006.01)
(Continued)

(52) U.S. Cl.
CPC .......... *G01N 1/405* (2013.01); *G01N 30/7233* (2013.01); *G01N 30/8631* (2013.01); *G01N 2030/027* (2013.01)

(58) Field of Classification Search
CPC ............... G01N 1/405; G01N 30/7233; G01N 30/8631; G01N 2030/027; G01N 30/56; G01N 2030/567; G01N 2030/8813
See application file for complete search history.

(56) References Cited

U.S. PATENT DOCUMENTS 10,487,402 B2  11/2019  Yuan et al.
10,881,986 B2   1/2021  Bischof et al.
(Continued)

FOREIGN PATENT DOCUMENTS

WO  2007012643 A1   2/2007
WO  2016191738 A1  12/2016
WO  2019165249 A1   8/2019

OTHER PUBLICATIONS

De Vijlder et al. "Study on the loss of nucleoside mono-, di- and triphosphates and phosphorylated peptides to a metal-free LC-MS hardware." Int. J. Mass Spectrometry. 304(2011): 83-90.
(Continued)

*Primary Examiner* — David J Bolduc
(74) *Attorney, Agent, or Firm* — WOMBLE BOND DICKINSON (US) LLP; Deborah M. Vernon; Mark R. Deluca

(57) ABSTRACT

The present disclosure discusses a method of separating a sample (e.g., pharmaceutical drug, genotoxic impurity, biomarker, and/or biological metabolite) including coating a metallic flow path of a chromatographic system; injecting the sample into the chromatographic system; flowing the sample through the chromatographic system; separating the sample; and analyzing the separated sample using mass spectroscopy. In some examples, the coating applied to the surfaces defining the flow path is non-binding with respect to the sample—and the separated sample. Consequently, the sample does not bind to the low-binding surface of the coating of the flow path. The applied coating can increase the chromatographic peak area for the sample of the chromatographic system.

13 Claims, 41 Drawing Sheets

Related U.S. Application Data continuation of application No. 17/150,793, filed on Jan. 15, 2021, now Pat. No. 11,530,966.

(60) Provisional application No. 63/071,750, filed on Aug. 28, 2020, provisional application No. 62/962,476, filed on Jan. 17, 2020.

(51) Int. Cl.
*G01N 30/86* (2006.01)
*G01N 30/02* (2006.01)

(56) References Cited

U.S. PATENT DOCUMENTS

| | | |
|---|---|---|
| 11,131,020 B2 | 9/2021 | Barone |
| 2015/0024152 A1 | 1/2015 | Carr et al. |
| 2016/0258969 A1 | 9/2016 | Crawford et al. |
| 2019/0086371 A1 | 3/2019 | Lauber et al. |
| 2019/0277734 A1 | 9/2019 | Smith et al. |
| 2019/0346410 A1 | 11/2019 | Guzzonato et al. |
| 2020/0269157 A1 | 8/2020 | DeLano et al. |

OTHER PUBLICATIONS

International Search Report and Written Opinion issued in International Application No. PCT/IB2021/050312 dated Apr. 15, 2021.

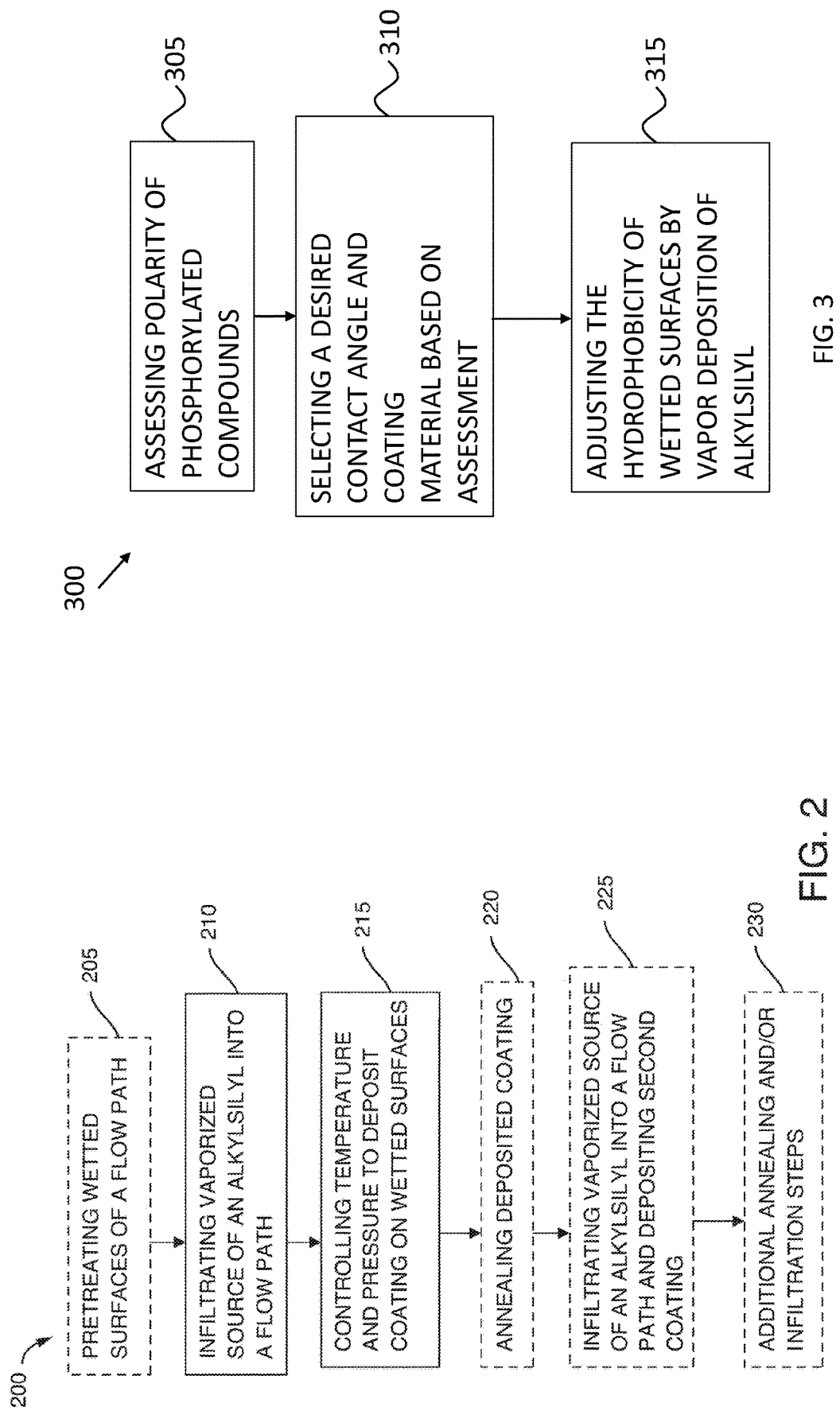

Diazoxide

Bicalutamide

Gentisic acid

| Compound | Compound Type | Biological Concentration Range |
|---|---|---|
| Isocitric acid | Biological metabolite | 0-10uM Blood; 20-89.2umol/mmol creatinine Urine<br>2.5uM Stock solution |
| Citric acid | Biological metabolite; preservative; flavor additive | 30-400uM Blood; 49-600umol/mmol creatinine Urine<br><br>2.5uM Stock solution |
| Malic acid | Biological metabolite; flavor additive | 2.5uM Stock solution |
| 2-hydroxyglutaric acid | Biological metabolite | 2.5uM Stock solution |
| 3-Phosphoglyceric acid | Biological metabolite | 2.5uM Stock solution |
| NDMA | Genotoxic impurity | None allowed |
| NDEA | Genotoxic impurity | None allowed |
| Losartan | Pharmaceutical Drug | varies |
| Valsartan | Pharmaceutical Drug | varies |
| Methylmalonic acid | Clinical Marker | 0-0.4uM Blood; 0-3.6umol/mmol creatinine Urine |
| Gentisic acid | Biological metabolite; biomarker | 0.12-1.31uM Blood |
| 4-Hydroxybenzoic acid | Biological metabolite; biomarker | |
| Aponorphine | Pharmaceutical Drug | varies |
| AMP | Biological metabolite | |
| ATP | Biological metabolite | |
| Diazoxide | Pharmaceutical Drug | varies |
| Bicalumatide | Pharmaceutical Drug | varies |
| Salmeterol | Pharmaceutical Drug | varies |
| Dobutamide | Pharmaceutical Drug | varies |

FIG. 13A

| Compound | Concentration Reference | Sample Matrix |
|---|---|---|
| Isocitric acid | http://www.hmdb.ca/metabolites/HMDB000019#concentrations | Human Urine, dilution<br>Pooled Human Urine, dilution |
| Citric acid | http://www.hmdb.ca/metabolites/HMDB000094#concentrations | Human Urine, dilution<br>Pooled Human Urine, dilution |
| Malic acid | | Human Urine, dilution<br>Pooled Human Urine, dilution |
| 2-hydroxyglutaric acid | | Pooled Human Urine, dilution |
| 3-Phosphoglyceric acid | | Human Urine, dilution<br>Pooled Human Urine, dilution |
| NDMA | | Standard Solution |
| NDEA | | Standard Solution |
| Losartan | | Standard Solution |
| Valsartan | | Standard Solution |
| Methylmalonic acid | http://www.hmdb.ca/metabolites/HMDB000202#concentrations | Extracted Human Plasma, Spike with Standard Solution |
| Gentisic acid | http://www.hmdb.ca/metabolites/HMDB000152#concentrations | Standard Solution |
| 4-Hydroxybenzoic acid | | Standard Solution |
| Aponorphine | | Standard Solution |
| AMP | | Standard Solution |
| ATP | | Standard Solution |
| Diazoxide | | Standard Solution |
| Bicalumatide | | Standard Solution |
| Salmeterol | | Standard Solution |
| Dobutamide | | Standard Solution |

FIG. 13B

| Compound | Column Chemistry |
|---|---|
| Isocitric acid | CSH Phenyl Hexyl, 2.1x100mm, 1.7uM |
| | CSH Phenyl Hexyl, 2.1x100mm, 1.7uM |
| Citric acid | CSH Phenyl Hexyl, 2.1x100mm, 1.7uM |
| | CSH Phenyl Hexyl, 2.1x100mm, 1.7uM |
| Malic acid | CSH Phenyl Hexyl, 2.1x100mm, 1.7uM |
| | CSH Phenyl Hexyl, 2.1x100mm, 1.7uM |
| 2-hydroxyglutaric acid | CSH Phenyl Hexyl, 2.1x100mm, 1.7uM |
| 3-Phosphoglyceric acid | CSH Phenyl Hexyl, 2.1x100mm, 1.7uM |
| | CSH Phenyl Hexyl, 2.1x100mm, 1.7uM |
| NDMA | Atlantis PREMIER BEH C18 AX, 2.1x50mm, 1.7uM |
| NDEA | Atlantis PREMIER BEH C18 AX, 2.1x50mm, 1.7uM |
| Losartan | Atlantis PREMIER BEH C18 AX, 2.1x50mm, 1.7uM |
| Valsartan | Atlantis PREMIER BEH C18 AX, 2.1x50mm, 1.7uM |
| Methylmalonic acid | CSH C18, 2.1x100mm, 1.7uM |
| Gentisic acid | Atlantis PREMIER BEH C18 AX, 2.1x50mm, 1.7uM |
| 4-Hydroxybenzoic acid | Atlantis PREMIER BEH C18 AX, 2.1x50mm, 1.7uM |
| Aponorphine | Atlantis PREMIER BEH C18 AX, 2.1x50mm, 1.7uM |
| AMP | Atlantis PREMIER BEH C18 AX, 2.1x50mm, 1.7uM |
| ATP | Atlantis PREMIER BEH C18 AX, 2.1x50mm, 1.7uM |
| Diazoxide | Atlantis PREMIER BEH C18 AX, 2.1x50mm, 1.7uM |
| Bicalumatide | Atlantis PREMIER BEH C18 AX, 2.1x50mm, 1.7uM |
| Salmeterol | Atlantis PREMIER BEH C18 AX, 2.1x50mm, 1.7uM |
| Dobutamide | Atlantis PREMIER BEH C18 AX, 2.1x50mm, 1.7uM |

FIG. 13C

| Compound | Coating Technology | Area Stainless | Area RSD |
|---|---|---|---|
| Isocitric acid | C2 | 48802 | 7% |
|  | C2 |  |  |
| Citric acid | C2 | 529957 | 8% |
|  | C2 |  |  |
| Malic acid | C2 | 1130 | 9% |
|  | C2 |  |  |
| 2-hydroxyglutaric acid | C2 |  |  |
| 3-Phosphoglyceric acid | C2 | 280 | 27% |
|  | C2 |  |  |
| NDMA | C2 | 2818 | 5% |
| NDEA | C2 | 12382 | 6% |
| Losartan | C2 | 1749111 | 6% |
| Valsartan | C2 | 411801 | 7% |
| Methylmalonic acid | C2C10 | 20303 | 1% |
| Gentisic acid | C2 | 3944 | 16% |
| 4-Hydroxybenzoic acid | C2 | 9922 | 6% |
| Aponorphine | C2 | 6583.667 | 27% |
| AMP | C2 | 15530.5 | 28% |
| ATP | C2 | 1104.5 | 86% |
| Diazoxide | C2 | 1133.5 | 11% |
| Bicalumatide | C2 | 28065.83 | 8% |
| Salmeterol | C2 | 40584.33 | 10% |
| Dobutamide | C2 | 961 | 34% |

FIG. 13D

| Compound | Area Coated | Area RSD Coated | Fold Increase for Coated Hardware |
|---|---|---|---|
| Isocitric acid | 217623 | 5% | 4.5 |
|  |  |  | 2.1 |
| Citric acid | 915634 | 2% | 1.7 |
|  |  |  | 1.4 |
| Malic acid | 5451 | 12% | 4.8 |
|  |  |  | 5.8 |
| 2-hydroxyglutaric acid |  |  | 3.5 |
| 3-Phosphoglyceric acid | 11481 | 9% | 41.1 |
|  |  |  | >100 |
| NDMA | 6436 | 1% | 2.3 |
| NDEA | 17724 | 0.2% | 1.4 |
| Losartan | 2363744 | 1% | 1.4 |
| Valsartan | 633951 | 1% | 1.5 |
| Methylmalonic acid | 60129 | 5% | 3.0 |
| Gentisic acid | 5953 | 9% | 1.5 |
| 4-Hydroxybenzoic acid | 12973 | 9% | 1.3 |
| Aponorphine | 8276 | 26% | 1.3 |
| AMP | 23194.5 | 5% | 1.5 |
| ATP | 21082.17 | 3% | 19.1 |
| Diazoxide | 1752 | 10% | 1.55 |
| Bicalumatide | 44391 | 7% | 1.6 |
| Salmeterol | 50837.67 | 4% | 1.3 |
| Dobutamide | 1685.5 | 30% | 1.8 |

FIG. 13E

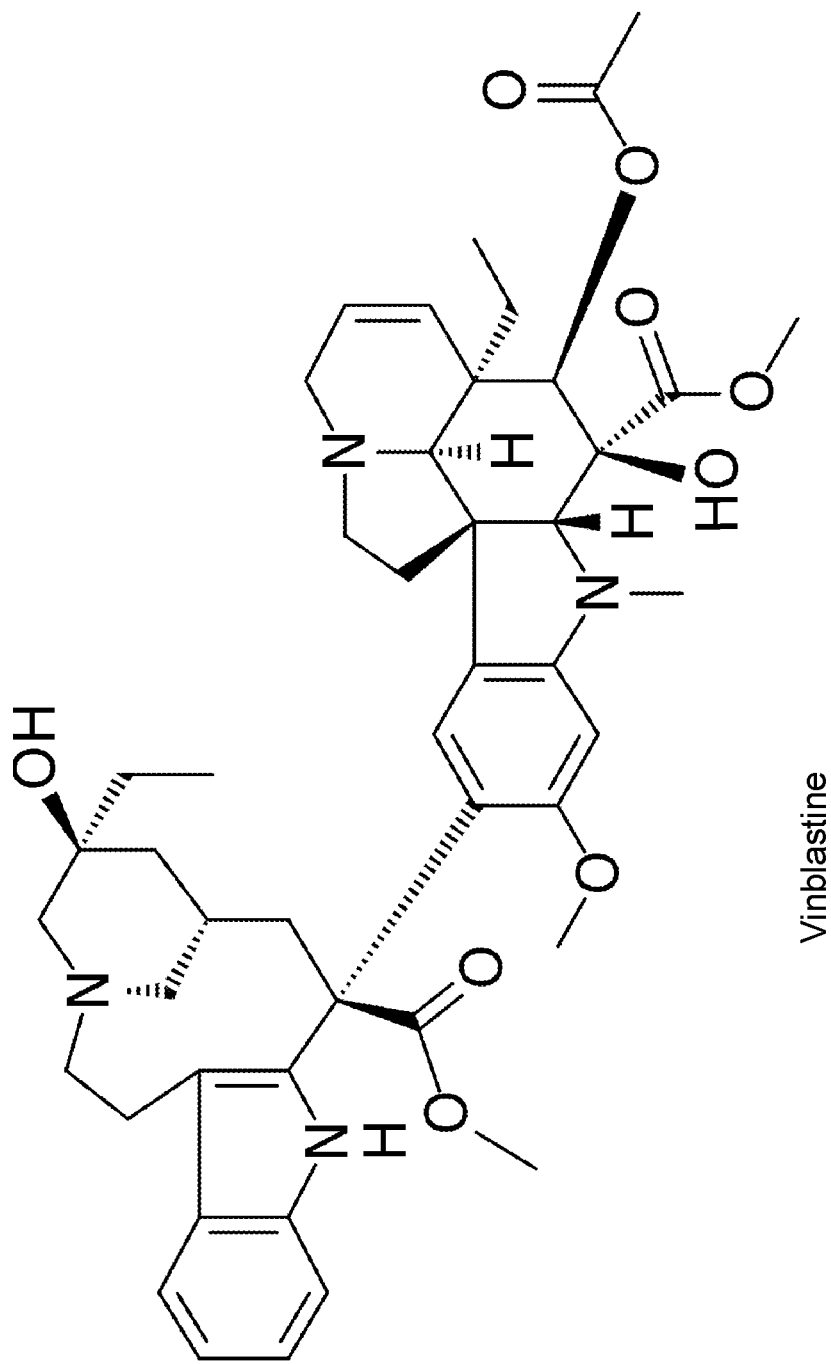
FIG. 15A Vinblastine

METHODS TO INCREASE SENSITIVITY OF LC/MS ANALYSIS

CROSS REFERENCE TO RELATED APPLICATIONS

This application is a continuation of U.S. application Ser. No. 17/990,029, filed Nov. 18, 2022 entitled "Methods to Increase Sensitivity of LC/MS Analysis" which is a continuation of U.S. application Ser. No. 17/150,793, filed Jan. 15, 2021 entitled "Methods to Increase Sensitivity of LC/MS Analysis", which claims priority to and benefit of U.S. provisional application No. 62/962,476, filed Jan. 17, 2020 entitled "Methods to Increase Sensitivity of LC/MS Analysis" and priority to and benefit of U.S. provisional application No. 63/071,750, filed Aug. 28, 2020 entitled "Methods to Increase Sensitivity of LC/MS Analysis." The contents of each application is incorporated herein by reference in their entirety.

FIELD OF THE TECHNOLOGY

The present disclosure relates to the use of vapor deposition coated flow paths for improved chromatography and sample analysis using liquid chromatography—mass spectrometry (LC/MS). More specifically, this technology relates to separating analytes in a sample using chromatographic devices having coated flow paths, methods of separating analytes in a sample (for example, phosphorylated compounds) using a fluidic system that includes coated flow paths, and methods of tailoring a fluidic flow path for separation and analysis of a sample using LC/MS.

BACKGROUND

Analytes that interact with metal have often proven to be very challenging to separate. The desire to have high pressure capable chromatographic systems with minimal dispersion has required that flow paths decrease in diameter and be able to withstand increasingly high pressures at increasingly fast flow rates. As a result, the material of choice for chromatographic flow paths is often metallic in nature. This is despite the fact that characteristics of certain analytes, for example, biomolecules, proteins, glycans, peptides, oligonucleotides, pesticides, bisphosphonic acids, anionic metabolites, and zwitterions like amino acids and neurotransmitters, are known to have unfavorable interactions, so called chromatographic secondary interactions, with metallic surfaces.

The proposed mechanism for metal specific binding interactions requires an understanding of the Lewis theory of acid-base chemistry. Pure metals and metal alloys (along with their corresponding oxide layers) have terminal metal atoms that have characteristics of a Lewis acid. More simply, these metal atoms show a propensity to accept donor electrons. This propensity is even more pronounced with any surface metal ions bearing a positive charge. Analytes with sufficient Lewis base characteristics (any substance that can donate non-bonding electrons) can potentially adsorb to these sites and thus form problematic non-covalent complexes. It is these substances that are defined as metal-interacting analytes.

For example, analytes having phosphate groups are excellent polydentate ligands capable of high affinity metal chelation. This interaction causes phosphorylated species to bind to the flow path metals thus reducing the detected amounts of such species, a particularly troublesome effect given that phosphorylated species are frequently the most important analytes of an assay.

Other characteristics of analytes can likewise pose problems. For example, carboxylate groups also have the ability to chelate to metals, albeit with lower affinities than phosphate groups. Yet, carboxylate functional groups are ubiquitous in, for example, biomolecules, giving the opportunity for cumulative polydentate-based adsorptive losses. These complications can exist not only on peptides and proteins, but also glycans. For example, N-glycan species can at times contain one or more phosphate groups as well as one or more carboxylate containing sialic acid residues. Additionally, smaller biomolecules such as nucleotides and saccharides, like sugar phosphates, can exhibit similar behavior to the previously mentioned N-glycan molecules. Moreover, chromatographic secondary interactions can be especially problematic with biomolecules, particularly larger structures, because they have a capacity (via their size and structural order) to form microenvironments that can adversely interact with separation components and flow path surfaces. In this case, a biomolecule or analyte having larger structures, can present structural regions with chemical properties that amplify a secondary interaction to the material of a flow path. This, combined with the cumulative metal chelation effects curtails the overall effective separation of biomolecules, pesticides, bisphosphonic acids, anionic metabolites, and zwitterions like amino acids and neurotransmitters.

An alternative to using metal flow paths is to use flow paths constructed from polymeric materials, such as polyether ether ketone (PEEK). PEEK tubing, like most polymeric materials, is formed by means of an extrusion process. With polymeric resin, this manufacturing process can lead to highly variable internal diameters. Accordingly, PEEK column hardware yields unfavorable differences in the retention times as can be observed from switching between one column and the next. Often, this variation can be a factor of three higher than a metal constructed column. In addition, the techniques for fabricating polymer based frits are not yet sufficiently optimized to afford suitably rugged components for commercial HPLC columns. For example, commercially available PEEK frits tend to exhibit unacceptably low permeability.

Ongoing efforts to reduce chelation and secondary chromatographic interactions of analytes with metal chromatographic surfaces in an effort to facilitate chromatographic separation having higher resolutions are therefore needed. In addition, variability in the separation and detection of compounds can be caused by many factors. One such factor is analyte/surface interactions of compounds with the analytical column. Such interactions can be problematic, especially at very low concentrations of analytes.

SUMMARY

To address problems experienced in separations in metallic fluidic systems, column hardware using a coating has been developed to define a low-binding surface(s) (LBS). Column hardware with LBS can provide increases in chromatographic peak area, including chromatographic peak lift, and can separate complex compounds that are metal sensitive, such as, pharmaceutical drugs, biological metabolites, biomarkers, and genotoxic impurities. Examples of pharmaceutical drugs that can be separated and analyzed using the present technology include: diazoxide, bicalutamide, salmeterol, apomorphine, dobutamide, losartan, valsartan and vinblastine. An example of a biomarker that can be separated and analyzed using the present technology includes gentisic acid. Examples of biological metabolites that can be separated and analyzed using the present technology include AMP and ATP. Examples of genotoxic impurities include N-nitrosodimethylamine (NDMA) and N-nitrosodethylamine (NDEA).

The present technology includes a coating, such as alkylsilyl coating, that can provide a LBS to increase analyte recovery, sensitivity, as well as reproducibility by minimizing the analyte/surface interactions that can lead to sample losses. For example, a chromatographic column, such as a mixed-mode anion exchange column, incorporates the coating of the present disclosure; the mixed-mode anion exchange column has been designed to improve the retention of polar acidic analytes under reversed phase chromatographic conditions while also minimizing negative analyte/surface interactions for compounds. In the present disclosure, metal sensitive compounds, pharmaceutical drugs as well as biological metabolites were tested using the mixed-mode anion exchange column with and without the coating on the column hardware.

Non-specific binding of phosphorylated compounds, such as oligonucleotides, within chromatographic systems negatively impacts the ability to detect and accurately quantify these molecules. The mechanism of non-specific binding is due to the interaction of the analyte with metallic surfaces in the flow path. Due to the presence of multiple phosphate groups, oligonucleotides are excellent polydentate ligands capable of high affinity metal chelation. This interaction leads to a reduced amount of analyte detected, reduced repeatability of analysis, and inaccurate quantitation. This becomes especially pronounced at lower concentrations where the percentage of analyte that is bound to the surface is very high relative to the total concentration.

Existing techniques to mitigate these interactions, such as system passivation with nitric acid, are time consuming and only produce temporary performance gains. It is difficult to determine when the system is fully passivated and ready to operate. If attempts are made to obtain data for quantitative studies before full passivation is reached, the lower end of the curve would not be detected because the analyte still has metallic surfaces it can bind to. In the present technology, coating of the metallic surfaces defining the flow path offers demonstrably better chromatographic peak area. That is, an alkylsilyl coating covering underlying metallic surfaces prevents analyte interactions with the underlying metal. In some embodiments the alkylsilyl coating covers substantially all fluid contacting surfaces (e.g., 95% surface area, 97% surface area %, 99% surface area, 99.5% or more of surface area) of the column hardware (i.e., fluid contacting surfaces of the tubing, surfaces of frits, but not the stationary phase media).

For example, an alkylsilyl coating on the surface area defining the flow path of a chromatographic system can minimize the interactions between phosphorylated compounds (including multi-phosphorylated compounds) and the metallic surfaces of chromatographic flow paths. Consequently, the coated metallic surfaces improve liquid chromatography separations for phosphorylated compounds. The use of alkylsilyl coatings on metal flow paths allows the use of metal chromatographic flow paths, which are able to withstand high pressures at fast flow rates, while minimizing the secondary chromatographic interactions between phosphorylated compounds (and other metal-sensitive samples) and the metal. These components made of high pressure material and modified with a coating can be tailored so that the internal flow paths reduce secondary chromatographic interactions. The coating covers the metallic surfaces, such as column walls and frits, that are exposed to the fluidic path.

In one aspect, the technology is directed to a method of separating a metal-sensitive sample. The method includes providing a chromatographic system having a layer of at least bis(trichlorosilyl)ethane or bis(trimethoxysilyl)ethane on at least a portion of a metallic flow path; injecting the metal-sensitive sample into the chromatographic system; separating the flowing metal-sensitive sample, wherein the metal-sensitive sample comprises a pharmaceutical drug, a biomarker, a genotoxic impurity, or a biological metabolite; and performing mass spectrometry on the separated metal-sensitive sample.

In another aspect, the technology is directed to a method of separating and analyzing a metal-sensitive sample. The method includes coating a metallic flow path of a chromatographic system with an alkylsilyl surface coating; injecting the metal-sensitive sample into the chromatographic system; flowing the metal-sensitive sample, wherein coating the metallic flow path of the chromatographic system increases a chromatographic peak area of the metal-sensitive sample in a range of 1.3× to 41.1× in comparison to an uncoated chromatographic system having metallic surfaces exposed to fluids; and passing the separated metal-sensitive sample through a mass spectrometer to analyze the separated sample.

Methods of the above aspects can include one or more of the following features. Certain methods feature the metal-sensitive sample not binding to the coated metallic flow path. That is, the metal-sensitive sample does not bind to the layer of at least bis(trichlorosilyl)ethane or bis(trimethoxysilyl)ethane or to the coating of the metallic flow path (e.g., an alkylsilyl coating). The metal-sensitive sample can be pharmaceutical drug, such as diazoxide, bicalutamide, salmeterol, apomorphine, dobutamide, losartan, valsartan, and vinblastine. In some embodiments, the metal-sensitive sample is gentisic acid or 4-hydroxybenzoic acid. In other embodiments the metal-sensitive sample is one or more of: AMP, ATP, isocitiric acid, citric acid, malic acid or 3-phosphoglyceric acid. The metal-sensitive sample can be NDMA or NDEA.

In another aspect, the technology is directed to a method of separating and analyzing a sample. The method includes providing a chromatographic system having an alkylsilyl coated metallic flow path; injecting the sample into the chromatographic system; flowing the sample through the chromatographic system; separating the sample, wherein the alkylsilyl coated metallic flow path of the chromatographic system increases a chromatographic peak area of the sample in a range of 1.3× to 41.1× in comparison to an uncoated chromatographic system having metallic surfaces exposed to fluid systems; and passing the separated sample through a mass spectrometer to analyze the separated sample.

In another aspect, the technology is directed to a method of separating a sample. The method includes providing a chromatographic system having a metallic flow path with an alkylsilyl coating on fluid exposed surfaces, the metallic flow path with the alkylsilyl coating preventing the sample from biding to underlying metal surfaces; injecting the sample into the chromatographic system; separating the sample, wherein the sample comprises a pharmaceutical drug, a biomarker, a genotoxic impurity, or a biological metabolite; and performing mass spectrometry on the separated sample.

The above aspects can include one or more of the following features. The methods can include a chromatographic system that utilizes a mix-mode chromatographic column or a phenyl-hexyl chromatographic column. The alkylsilyl coating of the methods can include a coating having bis(trichlorosilyl)ethane or bis(timethoxysilyl)ethane. The alkylsilyl coating can be a single layer or multiple layers.

All of the above aspects and features of the present technology provide numerous advantages over the prior art. In some embodiments, there are numerous benefits incorporating the coating on the column. For example, the present disclosure shows the benefits of increases in chromatographic peak area under LC/MS conditions that were observed in the range of 1.3× to 41.1× fold higher when comparing between columns with and without the coating. Many classes of compounds tested using the technology of the present disclosure showed benefits such as, metal-sensitive analytes, and phosphorylated compounds. The technology can be applied to the separation and study of pharmaceutical drugs, biological metabolites, and biomarkers.

BRIEF DESCRIPTION OF THE DRAWINGS

The technology will be more fully understood from the following detailed description taken in conjunction with the accompanying drawings, in which:

FIG. 2 is a flow chart of a method of coating a fluidic path (such as a fluidic path in a chromatography system) according to an illustrative embodiment of the technology.

FIG. 3 is a flow chart showing a method of tailoring a fluidic flow path for separation of a sample including a biomolecule, in accordance with an illustrative embodiment of the technology.

FIGS. 13A-13E summarize examples 1-20. In FIG. 13A, the compound, compound type, and biological concentration range used in one or more of examples 1-20 is provided. In FIG. 13B, the compound, concentration reference, and sample matrix used in one or more of examples 1-20 is provided. In FIG. 13C, the compound and column chemistry used in one or more of examples 1-20 is provided. In FIG. 13D, the compound, coating technology, area of stainless steel, and area RSD is provided. In FIG. 13E, the compound, area coated, area RSD coated, and fold increase for coated hardware is provided. The information provided in FIGS. 13A-13E is provided in chart form. That is, the first compound provided in each of FIGS. 13A-13E is isocitric acid. The first entry is for an amount of isocitric acid in blood/urine, the second entry is the amount of isocitric acid provided in a stock solution. The information contained in FIGS. 13B-13E for the isocitric acid (first compound, first and second entries) correspond to the first and second entries for isocitric acid in FIG. 13A.

FIG. 15A is an illustration of the vinblastine structure.

DETAILED DESCRIPTION

In general, the present disclosure is related to coating columns with low-binding surfaces to increase analyte recovery, reproducibility and sensitivity by minimizing negative analyte/surface interactions that can lead to sample losses. Coated columns in accordance with an embodiment of the present technology are available under the tradename of MaxPeak™ (Waters Corporation, Milford, MA). The present disclosure addresses the problematic binding of compounds on metallic surfaces of chromatographic systems. For example, phosphorylated compounds can interact with stainless steel to reduce analyte recovery and that this interaction can increase with the number of phosphorylated moieties present.

In addition, coating the system to have LBS minimizes uncertainty of the chromatographic system performance. Permanent passivation (or at least semi-permanent passivation, i.e., useable lifetime of a consumable) can be provided by the coating. For example, the system does not need to be passivated after each wash, and passivation does not effectively diminish after each wash or flowing. Consequently, the analyte detected using LC/MS can be depended upon as an accurate assessment of the analyte present.

One method of coating for LBS is the use of alkylsilyl coatings. In some aspects, the alkylsilyl coating acts a bioinert, low-bind coating to modify a flow path to address flow path interactions with an analyte, such as a metal-sensitive analyte. That is, the bioinert, low-bind coating minimizes surface reactions with the metal interacting compounds and allows the sample to pass along a flow path without clogging, attaching to surfaces, or change in analyte properties. The reduction/elimination of these interactions is advantageous because it allows for accurate quantification and analysis of a sample containing phosphorylated compounds or other metal-sensitive compounds. Further, for samples with low concentrations of analyte, MS detection is possible. The coating which creates LBS along the flow path prevents/significantly minimizes analyte loss to the metallic surface walls, thereby allowing low concentration of analytes to be detected. For some sample types, the use of a LBS allows for the sample to be detected. That is, certain samples, such as samples that may include methylmalonic acid or isocitric acid have a low concentration of analyte (e.g., in the range of 0.4 to 10 μM in blood, or 1 to 90 μmol/mmol creatinine in urine). This low range can be challenging for detection—an even more so if some portion of the analyte binds to the metallic surface walls.

Figure 1:
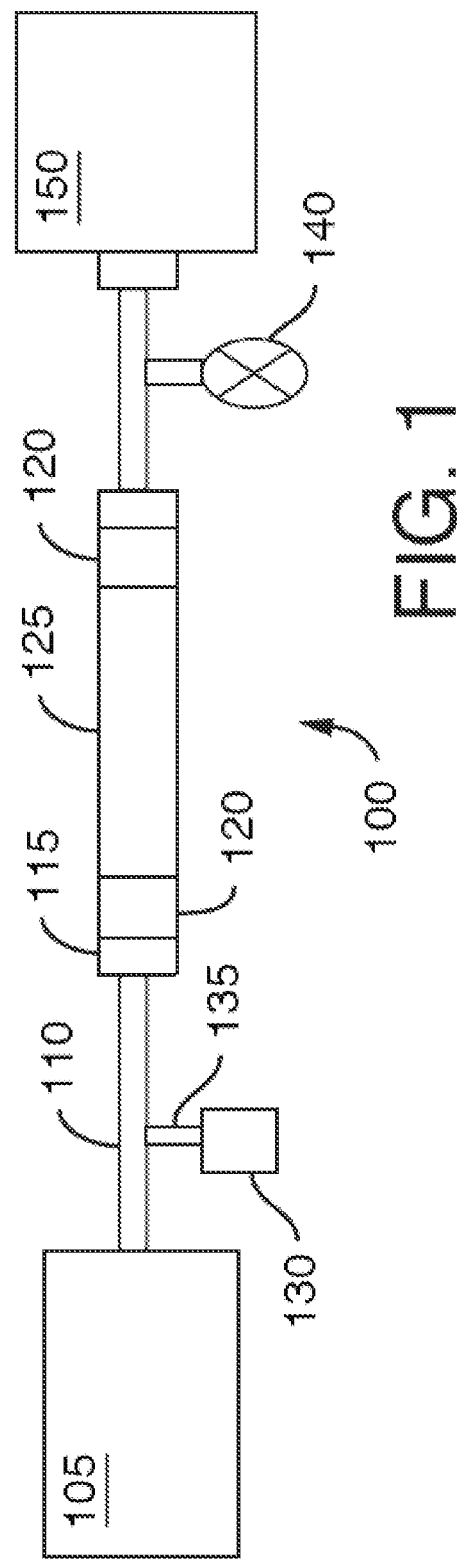
FIG. 1 is a schematic of a chromatographic flow system including a chromatography column and various other components, in accordance with an illustrative embodiment of the technology. A fluid is carried through the chromatographic flow system with a fluidic flow path extending from a fluid manager to a detector, such as a MS detector.

FIG. 1 is a representative schematic of a chromatographic flow system/device 100 that can be used to separate analytes, such as phosphorylated compounds, in a sample. Chromatographic flow system 100 includes several components including a fluid manager system 105 (e.g., controls mobile phase flow through the system), tubing 110 (which could also be replaced or used together with micro fabricated fluid conduits), fluid connectors 115 (e.g., fluidic caps), frits 120, a chromatography column 125, a sample injector 135 including a needle (not shown) to insert or inject the sample into the mobile phase, a vial, sinker, or sample reservoir 130 for holding the sample prior to injection, a detector 150, such as a mass spectrometer, and a pressure regulator 140 for controlling pressure of the flow. Interior surfaces of the components of the chromatographic system/device form a fluidic flow path that has wetted surfaces. The fluidic flow path can have a length to diameter ratio of at least 20, at least 25, at least 30, at least 35 or at least 40.

At least a portion of the wetted surfaces can be LBS by coating with an alkylsilyl coating to reduce secondary interactions by tailoring hydrophobicity. The coating can be applied by vapor deposition. As such, methods and devices of the present technology provide the advantage of being able to use high pressure resistant materials (e.g., stainless steel) for the creation of the flow system, but also being able to tailor the wetted surfaces of the fluidic flow path to provide the appropriate hydrophobicity so deleterious interactions or undesirable chemical effects on the sample can be minimized. In some examples, the coating of the flow path is non-binding with respect to the analyte, such as a metal-sensitive compound (e.g., a phosphorylated compound, a pharmaceutical drug, biological metabolite, a biomarker). Consequently, the analyte, such as phosphorylated compounds, does not bind to the coating of the flow path.

The alkylsilyl coating can be provided throughout the system from the tubing or fluid conduits 110 extending from the fluid manager system 105 all the way through to the detector 150. The coatings can also be applied to portions of the fluidic fluid path (e.g., at least a portion of the fluidic path). That is, one may choose to coat one or more components or portions of a component and not the entire fluidic path. For example, the internal portions of the column 125 and its frits 120 and end caps 115 can be coated whereas the remainder of the flow path can be left unmodified. Further, removable/replaceable components can be coated. For example, the vial or sinker 130 containing the sample reservoir can be coated as well as frits 120.

In one aspect, the flow path of the fluidic systems described herein is defined at least in part by an interior surface of tubing. In another aspect, the flow path of the fluidic systems described herein is defined at least in part by an interior surface of microfabricated fluid conduits. In another aspect, the flow path of the fluidic systems described herein is defined at least in part by an interior surface of a column. In another aspect, the flow path of the fluidic systems described herein is defined at least in part by passageways through a frit. In another aspect, the flow path of the fluidic systems described herein is defined at least in part by an interior surface of a sample injection needle. In another aspect, the flow path of the fluidic systems described herein extends from the interior surface of a sample injection needle throughout the interior surface of a column. In another aspect, the flow path extends from a sample reservoir container (e.g., sinker) disposed upstream of and in fluidic communication with the interior surface of a sample injection needle throughout the fluidic system to a connector/port to a detector.

In some embodiments, only the wetted surfaces of the chromatographic column and the components located upstream of the chromatographic column are LBS, coated with the alkylsilyl coatings described herein, while wetted surfaces located downstream of the column are not coated. The coating can be applied to the wetted surfaces via vapor deposition. Similarly, the "wetted surfaces" of labware or other fluid processing devices may benefit from alkylsilyl coatings described herein. The "wetted surfaces" of these devices not only include the fluidic flow path, but also elements that reside within the fluidic flow path. For example, frits and/or membranes within a solid phase extraction device come in contact with fluidic samples. As a result, not only the internal walls within a solid phase extraction device, but also any frits/membranes are included within the scope of "wetted surfaces." All "wetted surfaces" or at least some portion of the "wetted surfaces" can be improved or tailored for a particular analysis or procedure by including one or more of the coatings described herein. The term "wetted surfaces" refers to all surfaces within a separation device (e.g., chromatography column, chromatography injection system, chromatography fluid handling system, frit, etc.). The term can also apply to surfaces within labware or other sample preparation devices (e.g., extraction devices) that come into contact with a fluid, especially a fluid containing an analyte of interest.

Further information regarding the coating and the deposition of coatings in accordance with the present technology is available in US Patent Publication No. US2019/0086371, which is hereby incorporated by reference in its entirety.

In some examples, coating the flow path includes uniformly distributing the coating about the flow path, such that the walls defining the flow path are entirely coated. In some embodiments, uniformly distributing the coating can provide a uniform thickness of the coating about the flow path. In general, the coating uniformly covers the wetted surfaces such that there are no "bare" or uncoated spots.

Commercially available vapor deposition coatings can be used in the disclosed systems, devices, and methods, including but not limited to vapor deposited coatings provided under the trademarks Dursan® and Dursox® (commercially available from SilcoTek Corporation, Bellefonte, PA).

Alkylsilyl coatings include bis(trichlorosilyl)ethane or bis(trimethoxysilyl)ethane (also known as C2) coatings. In some embodiments, the alkylsilyl coatings include two or more layers. For example, a first layer including C2 can be vapor deposited followed by a second layer of C10 material (n-decyltrichlorosilane). US Patent Publication No. US2019/0086371 (and in particular, Table 1) provides numerous examples of illustrative embodiments.

The coatings described above can be used to create LBS and can tailor a fluidic flow path of a chromatography system for the separation of a sample. The coatings can be vapor deposited. In general, the deposited coatings can be used to adjust the hydrophobicity of internal surfaces of the fluidic flow path that come into contact with a fluid (i.e. wetted surfaces or surfaces coming into contact with the mobile phase and/or sample/analyte). By coating wetted surfaces of one or more components of a flow path within a chromatography system, a user can tailor the wetted surfaces to provide a desired interaction (i.e., a lack of interaction) between the flow path and fluids therein (including any sample, such as a sample containing oligonucleotides, within the fluid).

FIG. 2 is a flow chart illustrating method 200 for creating a LBS by tailoring a fluidic flow path for separation of a sample including phosphorylated compounds. The method has certain steps which are optional as indicated by the dashed outline surrounding a particular step. Method 200 can start with a pretreatment step 205 for cleaning and/or preparing a flow path within a component for tailoring. Pretreatment step 205 can include cleaning the flow path with plasma, such as oxygen plasma. This pretreatment step is optional.

Next, an infiltration step 210 is initiated. A vaporized source of an alkylsilyl compound is infiltrated into the flow path. The vaporized source is free to travel throughout and along the internal surfaces of the flow path. Temperature and/or pressure is controlled during infiltration such that the vaporized source is allowed to permeate throughout the internal flow path and to deposit a coating from the vaporized source on the exposed surface (e.g., wetted surfaces) of the flow path as shown in step 215. Additional steps can be taken to further tailor the flow path. For example, after the coating is deposited, it can be heat treated or annealed (step 220) to create cross linking within the deposited coating and/or to adjust the contact angle or hydrophobicity of the coating. Additionally or alternatively, a second coating of alkylsilyl compound (having the same or different form) can be deposited by infiltrating a vaporized source into the flow path and depositing a second or additional layers in contact with the first deposited layer as shown in step 225. After the deposition of each coating layer, an annealing step can occur. Numerous infiltration and annealing steps can be provided to tailor the flow path accordingly (step 230).

FIG. 3 provides a flow chart illustrating a method (300) of creating a LBS by tailoring a fluidic flow path for separation of a sample including a analyte, such as phosphorylated compounds. The method can be used to tailor a flow system for use in isolating, separating, and/or analyzing phosphorylated compounds. In step 305, phosphorylated compounds are assessed to determine polarity. Understanding the polarity will allow an operator to select (by either look up table or make a determination) a desired coating chemistry and, optionally, contact angle as shown in step 310.

In some embodiments, in addition to assessing the polarity of phosphorylated compounds, the polarity of a stationary phase to be used to separate the phosphorylated compounds (e.g., stationary phase to be included in at least a portion of the fluidic flow path) is also assessed. A chromatographic media (e.g., stationary phase) can be selected based on metal-sensitive compounds or phosphorylated compounds in the sample. Understanding the polarity of both the phosphorylated and/or metal-sensitive compounds and the stationary phase is used in certain embodiments by the operator to select the desired coating chemistry and contact angle in step 310. The components to be tailored can then be positioned within a chemical infiltration system with environmental control (e.g., pressure, atmosphere, temperature, etc.) and precursor materials are infiltrated into the flow path of the component to deposit one or more coatings along the wetted surfaces to adjust the hydrophobicity as shown in step 315. During any one of infiltration, deposition, and condition steps (e.g. annealing), coatings deposited from the infiltration system can be monitored and if necessary precursors and or depositing conditions can be adjusted if required allowing for fine tuning of coating properties.

EXAMPLES

In the present disclosure, metal sensitive compounds, pharmaceutical drugs as well as biological metabolites were tested using a mixed-mode anion exchange column sold under the tradename the Atlantis Premier BEH $C_{18}$ AX (available from Waters Corporation, Milford, MA) with and without a coating sold under the tradename MaxPeak™ (available from Waters Corporation, Milford, MA).

Examples 1 and 2 (Biological Metabolites)

Figures 4A, 4B:
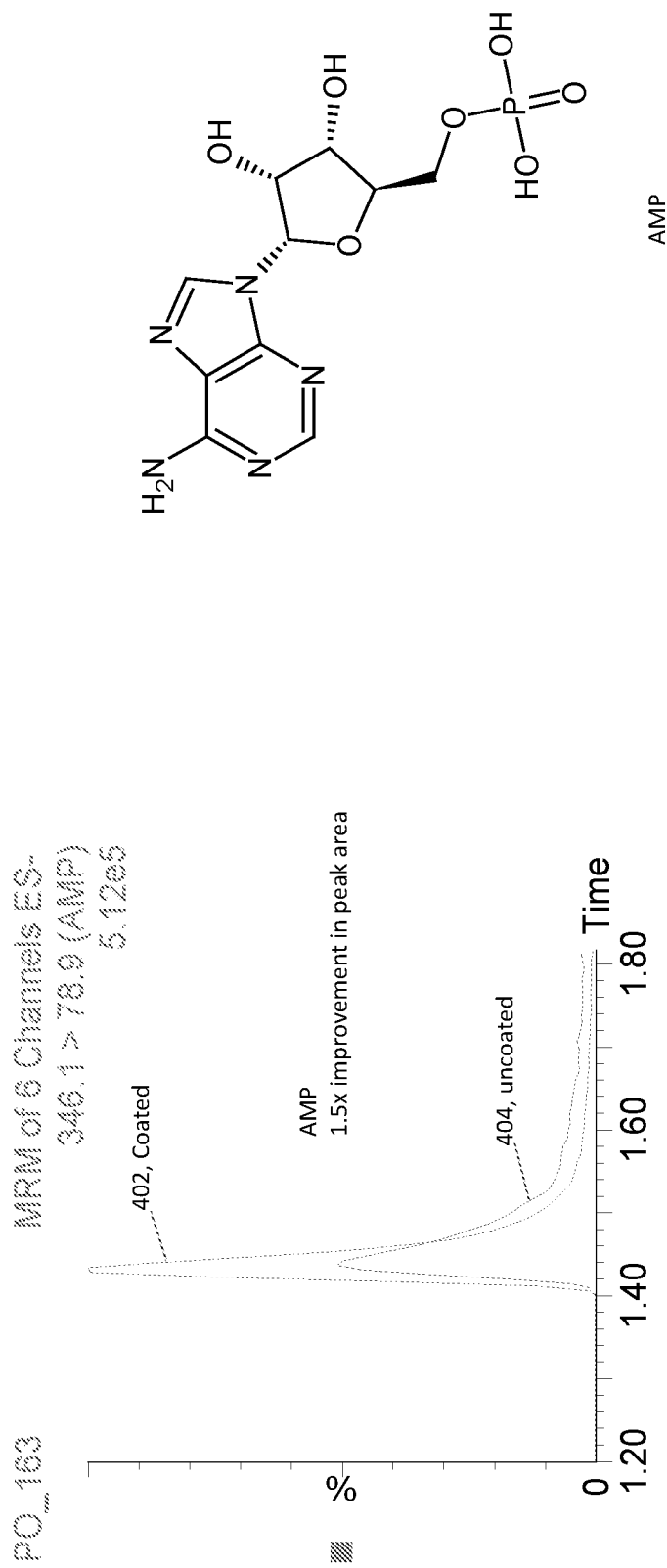
FIG. 4A is a graph showing the separation of AMP with a C2 coated column (top line, 402) and uncoated standard column (bottom line, 404).
FIG. 4B is an illustration of the AMP structure.
Figure 4D:
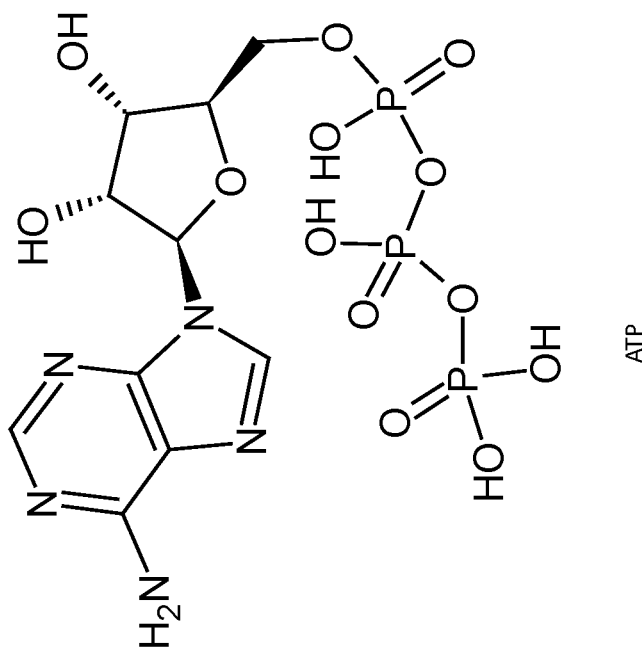
FIG. 4D is an illustration of the ATP structure.
Figure 4C:
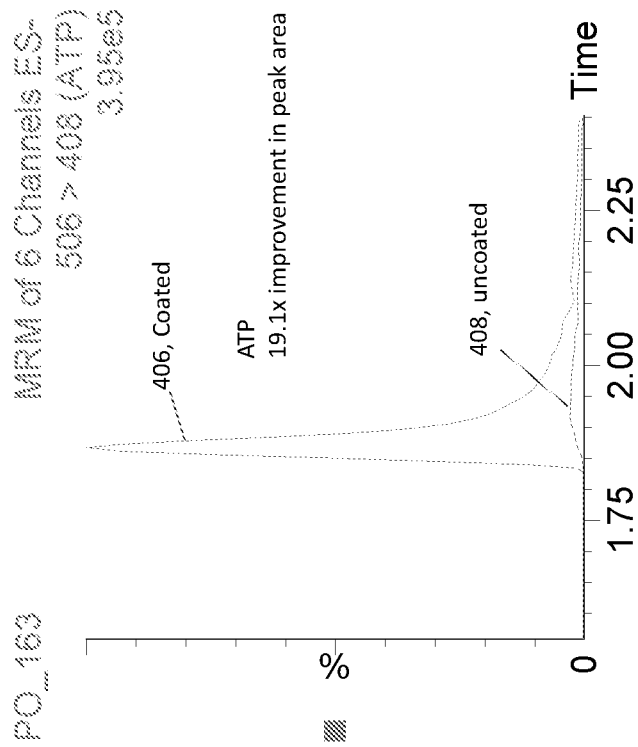
FIG. 4C is a graph showing the separation of ATP with a C2 coated column (top line, 406) and uncoated standard column (bottom line, 408).

To illustrate the benefit of MaxPeak™ (available from Waters Corporation, Milford, MA) LBS column hardware, standard solutions of adenosine 5'-monophosphate (AMP) and adenosine 5'-triphosphate (ATP) were chromatographically separated by the Atlantis Premier BEH $C_{18}$ AX (available from Waters Corporation, Milford, MA) material with and without MaxPeak™ LBS column hardware, C2 coating (available from Waters Corporation, Milford, MA). FIGS. 4A and 4B (Example 1, AMP) and FIGS. 4C and 4D (Example 2, ATP) show separation of AMP and ATP on the Atlantis Premier BEH $C_{18}$ AX sorbent (available from Waters Corporation, Milford, MA) with MaxPeak LBS column hardware (available from Waters Corporation, Milford, MA) (top line) and standard column hardware (bottom line). FIGS. 4A and 4B show the results of the analysis of a standard solution separated using a linear gradient of 10 mM ammonium acetate solution to 100% 10 mM ammonium acetate, pH 9.2 in 90:10 ACN/H2O over 3 minutes. While the peak area of AMP (Example 1, FIG. 4A, compare coated results 402 to uncoated results 404) increased more than 1.5× with the MaxPeak™ LBS column hardware (available from Waters Corporation, Milford, MA), the peak area of ATP (Example 2, FIG. 4C, compare coated results 406 to uncoated results 408) increased more than 19×. These results follow the trend seen in the analysis of multi-phosphorylated compounds.

Examples 3-9 (Pharmaceutical Drugs)

To further investigate the benefits of new column hardware, additional compounds including pharmaceutical drugs were tested using a water and ACN gradient each containing 10 mM ammonium formate, pH 3.0. The compounds spanned a range of molecular properties and sizes.

Figure 5B:
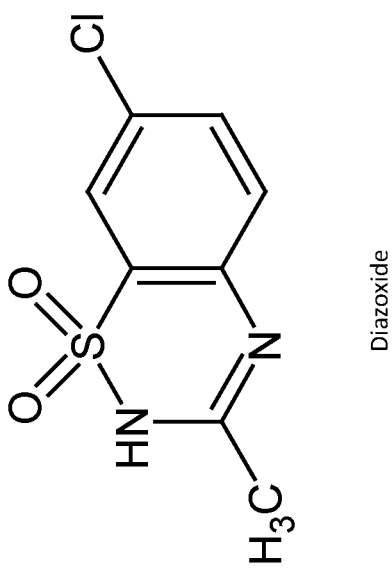
FIG. 5B is an illustration of the diazoxide structure.
Figure 5A:
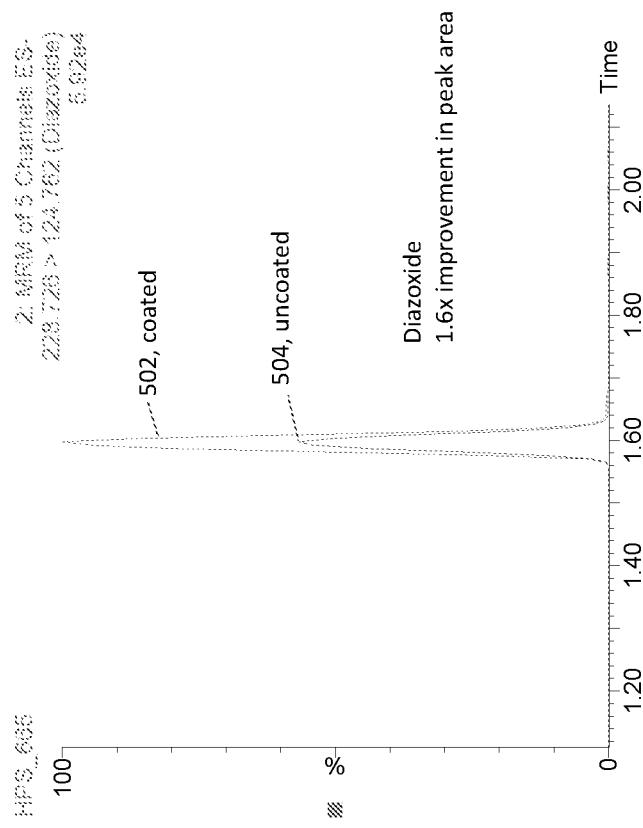
FIG. 5A is a graph showing the separation of diazoxide with a C2 coated column (top line, 502) and an uncoated standard column (bottom line, 504).
Figure 5D:
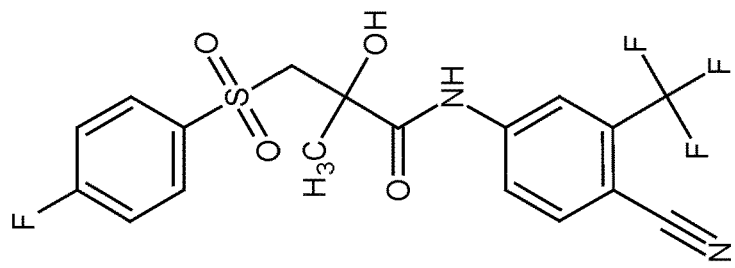
FIG. 5D is an illustration of the bicalutamide structure.
Figure 5C:
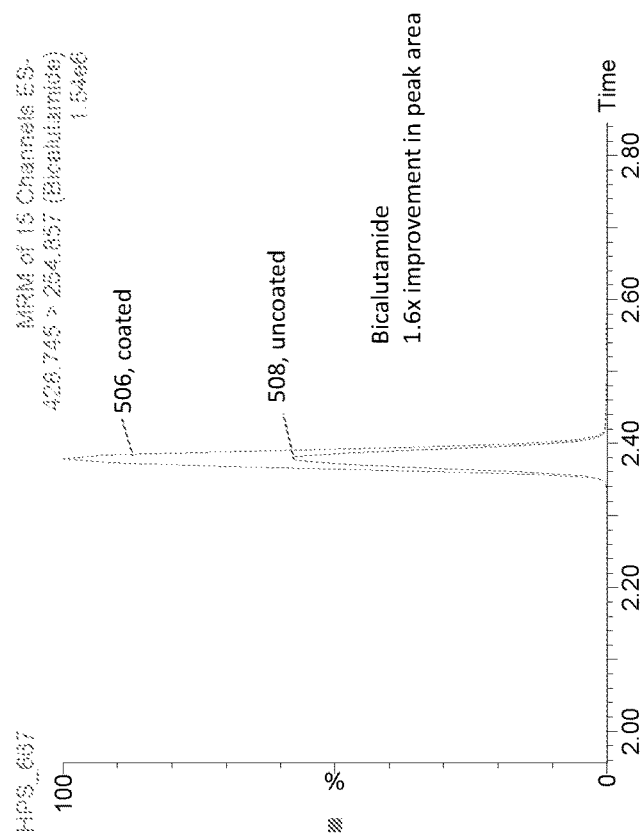
FIG. 5C is a graph showing the separation of bicalutamide with a C2 coated column (top line, 506) and an uncoated standard column (bottom line, 508).
Figures 5E, 5F:
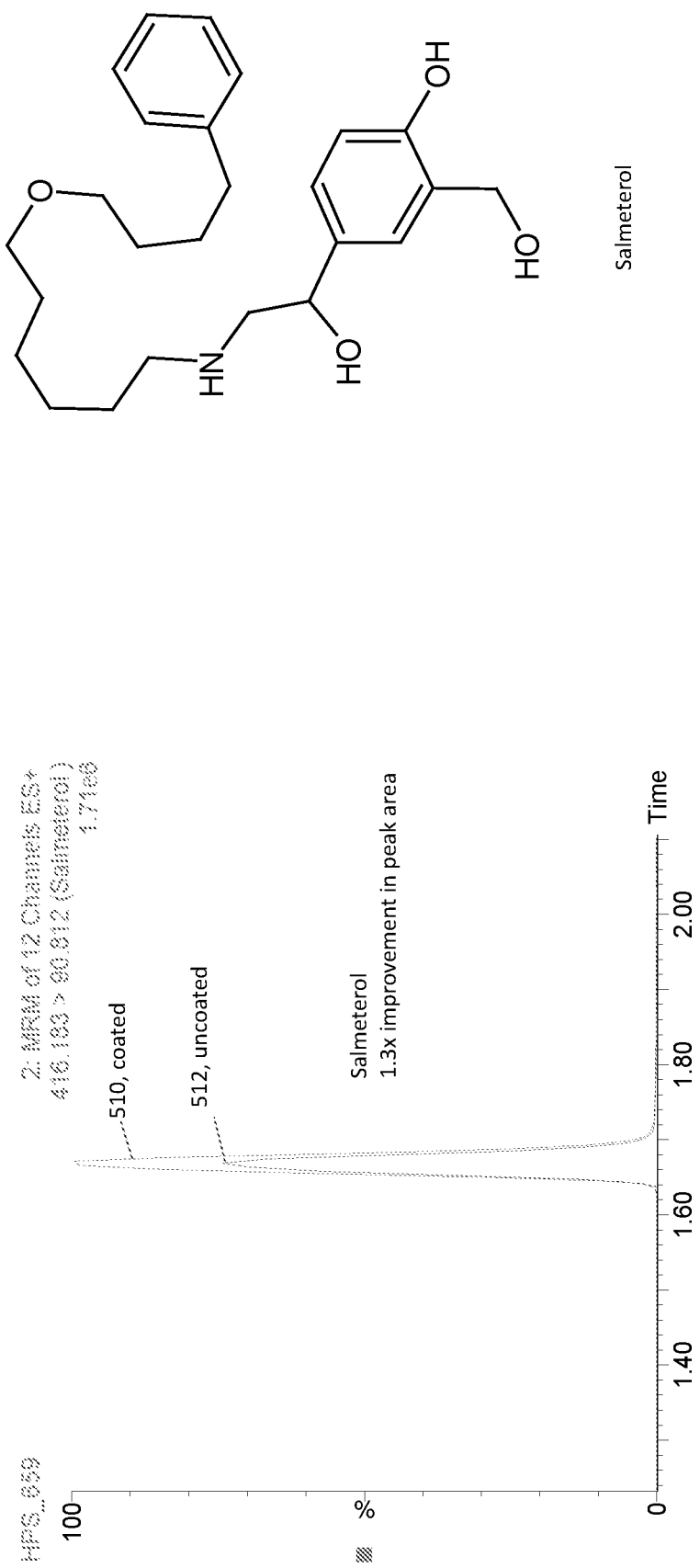
FIG. 5E is a graph showing the separation of salmeterol with a C2 coated column (top line, 510) and an uncoated standard column (bottom line, 512).
FIG. 5F is an illustration of the salmeterol structure.
Figure 5G:
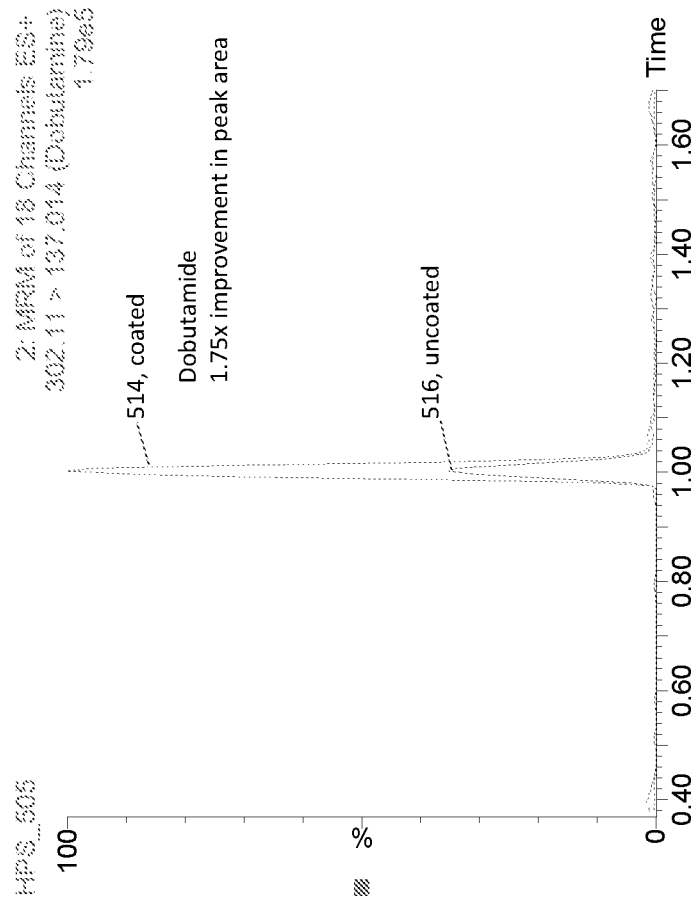
FIG. 5G is a graph showing the separation of dobutamide with a C2 coated column (top line, 514) and an uncoated standard column (bottom line, 516).
Figures 5H, 5I:
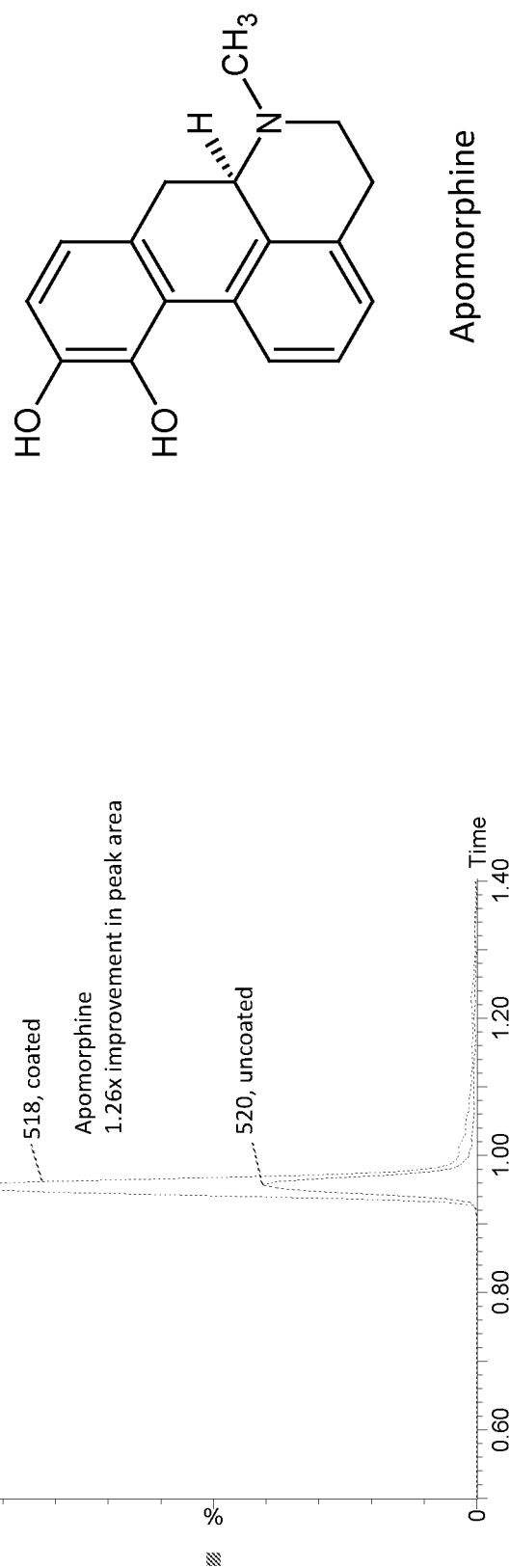
FIG. 5H is a graph showing the separation of apomorphine with a C2 coated column (top line, 518) and an uncoated standard column (bottom line, 520).
FIG. 5I is an illustration of the apomorphine structure.
Figure 5J:
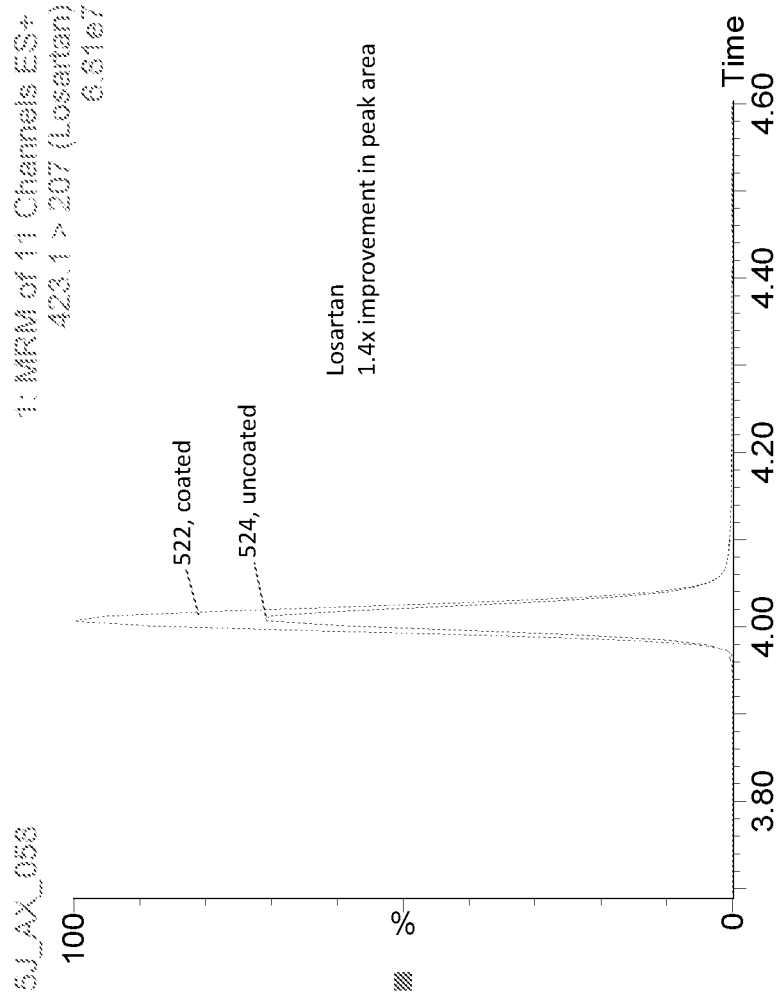
FIG. 5J is a graph showing the separation of losartan with a C2 coated column (top line, 522) and an uncoated standard column (bottom line), 524.
Figure 5K:
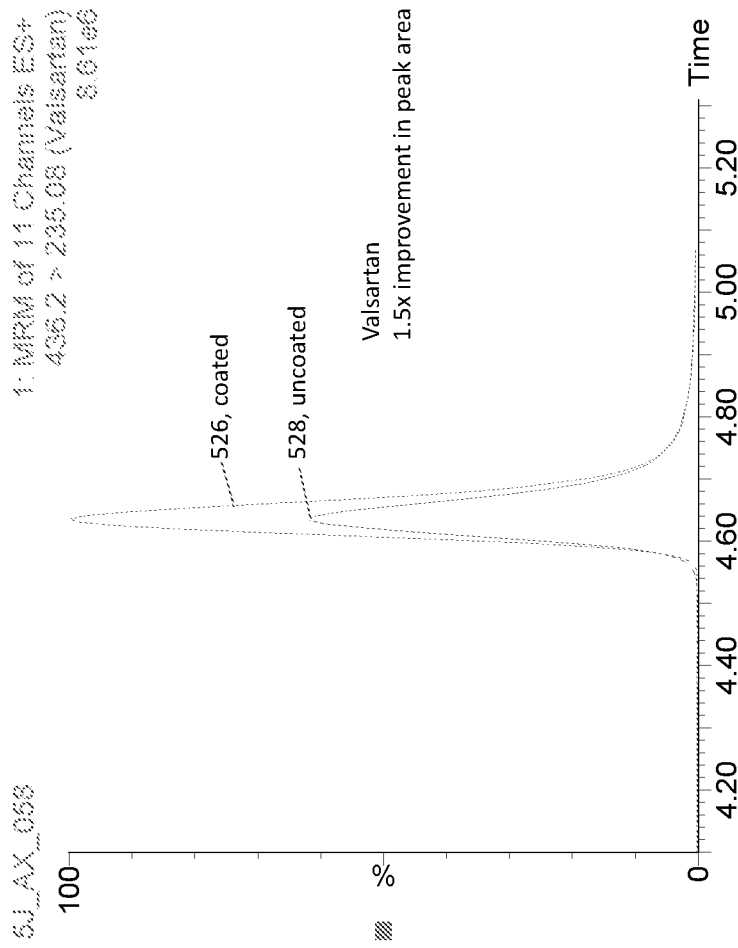
FIG. 5K is a graph showing the separation of valsartan with a C2 coated column (top line, 526) and an uncoated standard column (bottom line, 528).

Four examples of compounds tested are in FIGS. 5A-5K: diazoxide (anti-hypertensive medication) (Example 3, FIGS. 5A and 5B); bicalutamide (anti-androgenic drug) (Example 4, FIGS. 5C and 5D); salmeterol (asthma medication) (Example 5, FIGS. 5E and 5F); dobutamide (treatment for cardiac shock) (Example 6, FIG. 5G); apomorphine (morphine derivative) (Example 7, FIGS. 5H and 5I); losartan (antihypertensive drug) (Example 8, FIG. 5J); and valsartan (antihypertensive drug) (Example 9, FIG. 5K). FIGS. 5A, 5C, 5E, 5G, 5H, 5J and 5K showed chromatographic peaks for recovery of diazoxide, bicalutamide, salmeterol dobutamide, apomorphine, losartan, and valsartan on the Atlantis Premier BEH $C_{18}$ AX sorbent (available from Waters Corporation, Milford, MA) with MaxPeak LBS (available from Waters Corporation, Milford, MA) column hardware with C2 coating (top lines, coated results 502, 506, 510, 514, 518, 522, 526) and standard column hardware (bottom line, uncoated results 504, 508, 512, 516, 520, 524, 528). FIGS. 5A, 5C, 5E, 5G, 5H, 5J and 5K showed peak area increases of 1.6×, 1.6×, 1.3×, 1.8×, 1.3, 1.4×, and 1.5×, respectively, when analyzed using the MaxPeak™ LBS column hardware (available from Waters Corporation, Milford, MA).

Diazoxide and bicalutamide each contain sulfur dioxide, a constituent that can interact with metals. Without wishing to be bound by theory, one possible mechanism of action of diazoxide is binding to the $Zn^{2+}$ center of carbonic anhydrase to act as an inhibitor. Salmeterol contains hydroxyl and nitrogen moieties that, when in a particular spatial arrangement, can act as a Lewis Base and form chelates with metals.

These results suggest that even seemingly innocuous molecular constituents can impact the recovery and hence sensitivity of compounds. Coated hardware, such as that sold under the tradename MaxPeak™ coated hardware (available from Waters Corporation, Milford, MA) can mitigate these effects by creating an inert surface, thus preventing the compounds' interaction with metals.

Variability in the separation and detection of compounds can be caused by many factors. One such factor is analyte/surface interactions of compounds with the analytical column. Such interactions can be problematic, especially at very low concentrations of analytes.

To address this, a column hardware with a coating to provide LBS has been developed. The present technology includes a coating, such as alkylsilyl coating, to increase analyte recovery, sensitivity, as well as reproducibility by minimizing the analyte/surface interactions that can lead to sample losses. For example, a chromatographic column, such as a mixed-mode anion exchange column, incorporates the coating of the present disclosure; the mixed-mode anion exchange column has been designed to improve the retention of polar acidic analytes under reversed phase chromatographic conditions while also minimizing negative analyte/surface interactions for compounds. In the present disclosure, metal sensitive compounds, pharmaceutical drugs as well as biological metabolites were tested using the mixed-mode anion exchange column with and without the C2 coating on the column hardware.

Examples 10-11 (Biomarkers)

Biomarkers were also analyzed using the coated column hardware of the present technology. Each biomarker was tested using a water and ACN gradient each containing 10 mM ammonium formate, pH 3.0. The compounds spanned a range of molecular properties and sizes.

Figure 6A:
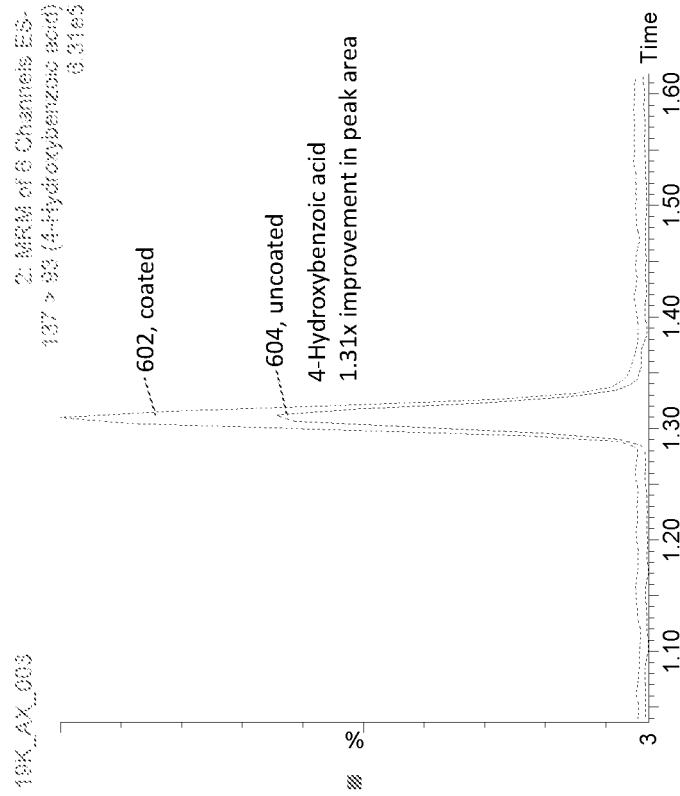
FIG. 6A is a graph showing the separation of 4-hydroxybenzoic acid with a C2 coated column (top line, 602) and an uncoated standard column (bottom line, 604).
Figure 6C:
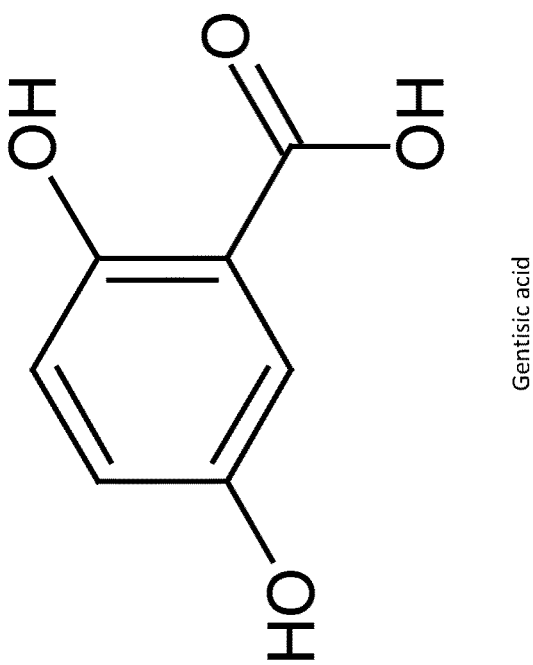
FIG. 6C is an illustration of the gentisic acid structure.
Figure 6B:
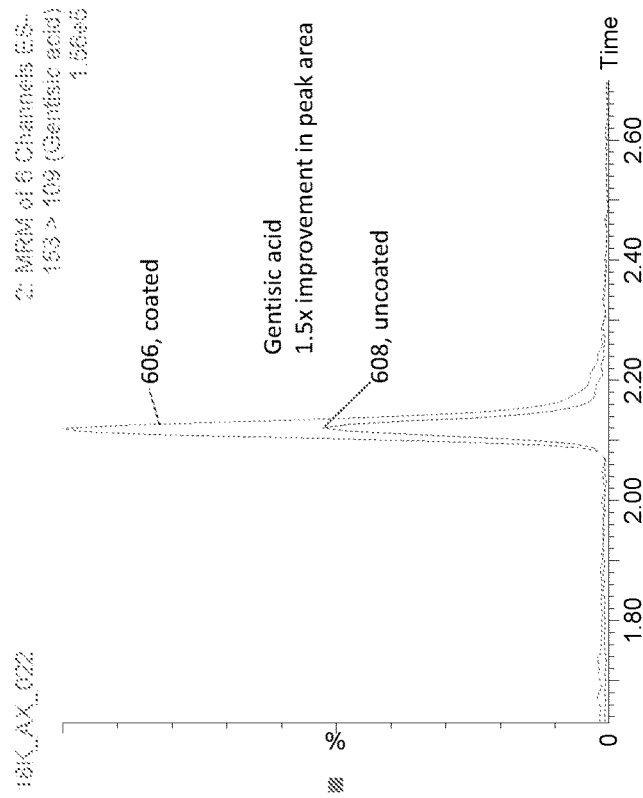
FIG. 6B is a graph showing the separation of gentisic acid with a C2 coated column (top line, 606) and an uncoated standard column (bottom line, 608).

Two biomarkers (4-hydroxybenzoic acid and gentisic acid) results are shown in FIGS. 6A-6B: 4-hydroxybenzoic acid (Example 10, FIG. 6A); and gentisic acid (Example 11, FIG. 6B). FIGS. 6A-6B show chromatographic peaks for recovery of 4-hydroxybenzoic acid (FIG. 6A), and gentisic acid (FIG. 6B) on the Atlantis Premier BEH $C_{18}$ AX sorbent (available from Waters Corporation, Milford, MA) with MaxPeak LBS (available from Waters Corporation, Milford, MA) column hardware with C2 coating (top line, coated results 602, 606) and standard column hardware (bottom line, uncoated results 604, 608). FIG. 6C illustrates the chemical structure of gentisic acid. FIGS. 6A-6B showed peak area increases of 1.3× and 1.5×, respectively, when analyzed using the MaxPeak™ LBS column hardware (available from Waters Corporation, Milford, MA).

Gentisic acid contains a carboxylic acid and hydroxyl moieties and 4-hydroxybenzoic acid contains hydroxyl moieties that, when in a particular spatial arrangement, can act as a Lewis Base and form chelates with metals. The results show that separation and therefore detection and analysis can be improved by utilizing the coated column to prevent these interactions.

Examples 12 and 13 (Genotoxic Impurities)

Genotoxic impurities were also analyzed using the coated column hardware of the present technology. The presence of drug-substance and drug-product impurities that are, or may be DNA-reactive, has posed significant problems for drug regulators and industry. The principal concern relates to drug safety in that exposure, particularly if prolonged, to compounds that can alter (alkylate) DNA may ultimately produce a carcinogenic response. A further practical issue is that the conventional testing procedures applied to drug substances for carcinogenicity and mutagenicity/genotoxicity (the property of being able to damage cellular DNA and induce genetic mutation) generally lack sufficient sensitivity to detect potentially adverse effects associated with DNA-reactive impurities (which are often present only at ppm levels). Therefore, it is of great importance that samples containing possible genotoxic impurities for quantity analysis do not interact with the walls of the sample preparation or separation devices. Each genotoxic impurity was tested using a water and methanol gradient. A portion of 2% aqueous formic acid was also applied.

Figure 7A:
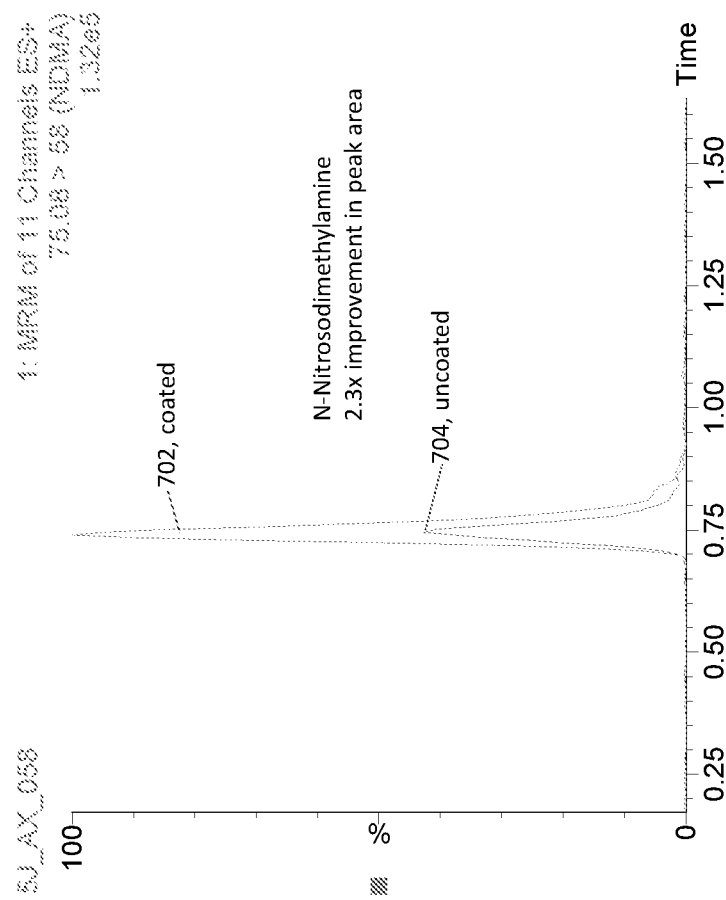
FIG. 7A is a graph showing the separation of N-nitrosodimethylamine (NDMA) with a C2 coated column (top line, 702) and an uncoated standard column (bottom line, 704).
Figure 7B:
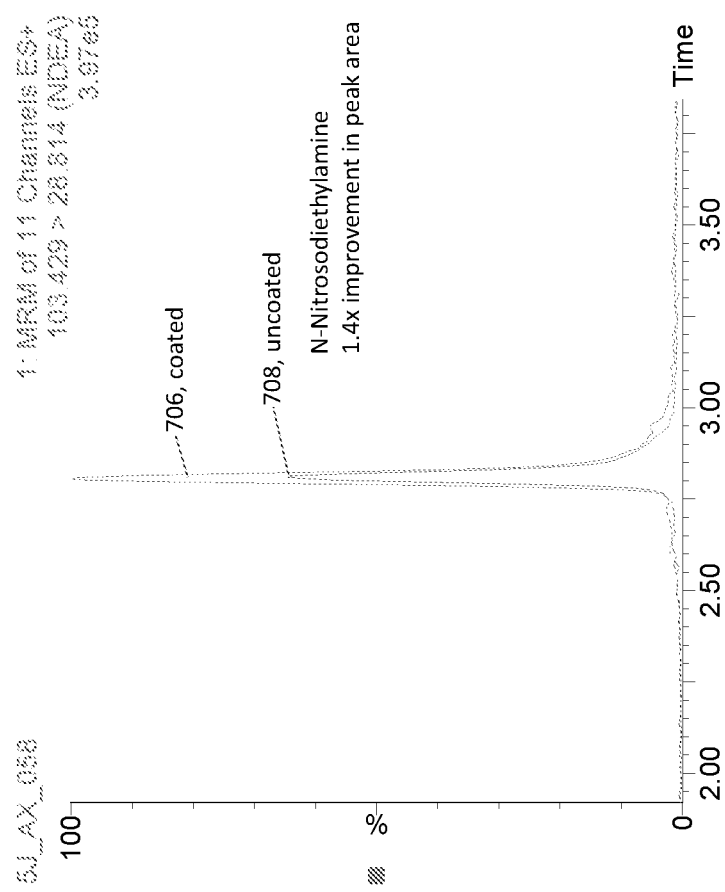
FIG. 7B is a graph showing the separation of N-nitrosodiethylamine (NDEA) with a C2 coated column (top line, 706) and an uncoated standard column (bottom line, 708).

Both genotoxic impurities tested (N-nitrosodimethylamine (NDMA) and N-nitrosodiethylamine (NDEA)) showed that coated column hardware resulted in improved peak area results. FIG. 7A show chromatographic peak for recovery of NDMA on the Atlantis Premier BEH $C_{18}$ AX sorbent (available from Waters Corporation, Milford, MA) with MaxPeak LBS (available from Waters Corporation, Milford, MA) column hardware with C2 coating (top line, 702) and standard column hardware (bottom line, uncoated result 704); whereas FIG. 7B shows chromatographic peak for recovery of NDEA on the Atlantis Premier BEH $C_{18}$ AX sorbent (available from Waters Corporation, Milford, MA) with MaxPeak LBS (available from Waters Corporation, Milford, MA) column hardware with C2 coating (top line, 706) and standard column hardware (bottom line, uncoated result 708). FIGS. 7A-7B showed peak area increases of 2.3× and 1.4×, respectively, when analyzed using the MaxPeak™ LBS column hardware (available from Waters Corporation, Milford, MA). These are important improvements as samples possibly containing genotoxic impurities generally have very low concentration of the genotoxic impurity. As a result, any interaction that binds with the genotoxic impurity and further reduces the concentration may place the sample out of a detectable range.

Examples 14-19 (Additional Column Chemistries)

The above examples have all featured a mix-mode chemistry—Atlantis PREMIER BEH C18 AX from Waters Corporation. Each of the above examples featured a separation using this mix-mode column without a coating compared to the same separation but on the mix-mode column with an applied C2 coating. The technology need not be limited to mix-mode stationary phases. To illustrate improved separation on different column chemistries, four different biological metabolites contained in a sample matrix of human urine were separated on a charged surface phenyl hexyl column (2.1×100 mm, 1.7 micron particles). Each biological metabolite was separated on an uncoated CSH phenyl hexyl column, and then the same biological metabolite was also separated on a C2 coated CSH phenyl hexyl column. Improved peak area results were found for each example when the coated column was used.

Figure 8A:
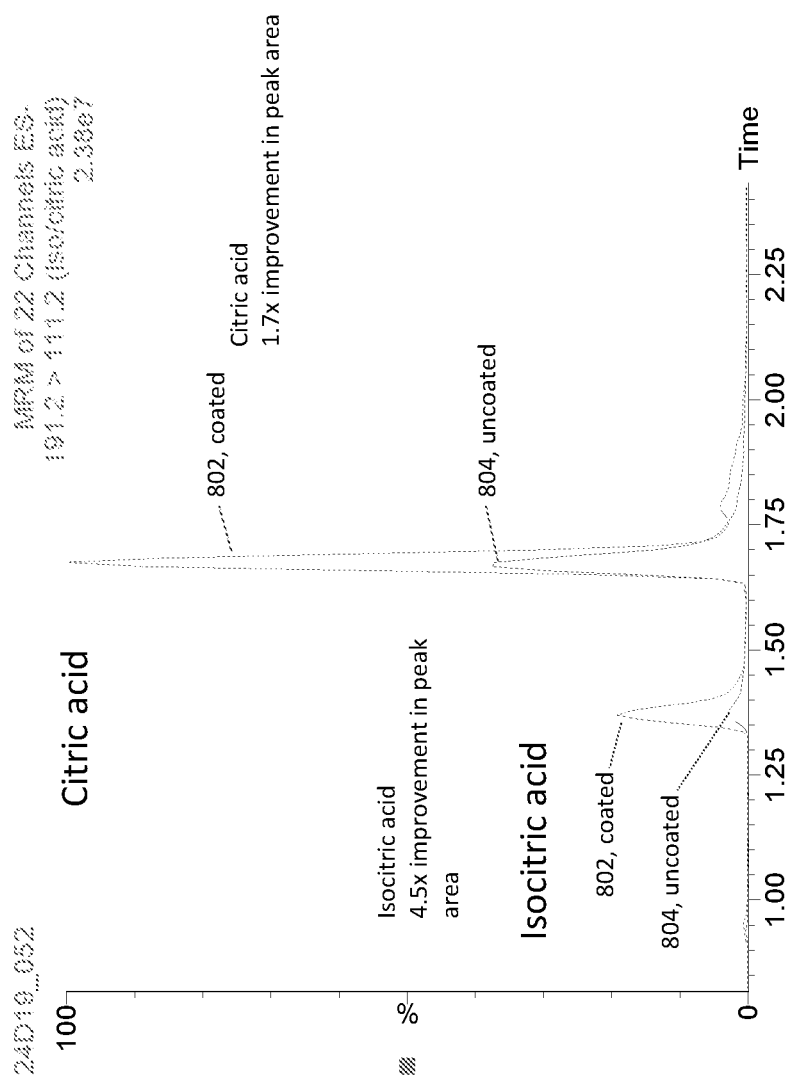
FIG. 8A is a graph showing the separation of isocitric acid and citric acid with a C2 coated column (top line, 802) and an uncoated standard column (bottom line, 804).

Example 14 is a study of isocitric acid and citric acid, both biological metabolites. These metabolites generally have a concentration in the range of 20 to 90 μmol/mmol creatinine in urine for isocitric acid and 49 to 600 μmol/mmol creatinine in urine for citric acid. As a result of their low concentration, it can be difficult to quantify these metabolites. FIG. 8A shows that an improvement in peak area is achieved for both when using the present coated hardware technology. In particular, a 4.5× improvement in peak area over uncoated CSH phenyl hexyl column chemistry is achieved by the application of a C2 coating for isocitric acid and a 1.7× improvement in peak area is achieved for citric acid over the uncoated technology. The results for the coated hardware are indicated by line 802 (top line) and the results for the uncoated hardware are indicated by line 804 (bottom line). The peak for isocitric acid appears first at about 1.40; whereas the peak for citric acid appear around 1.70.

Figure 8B:
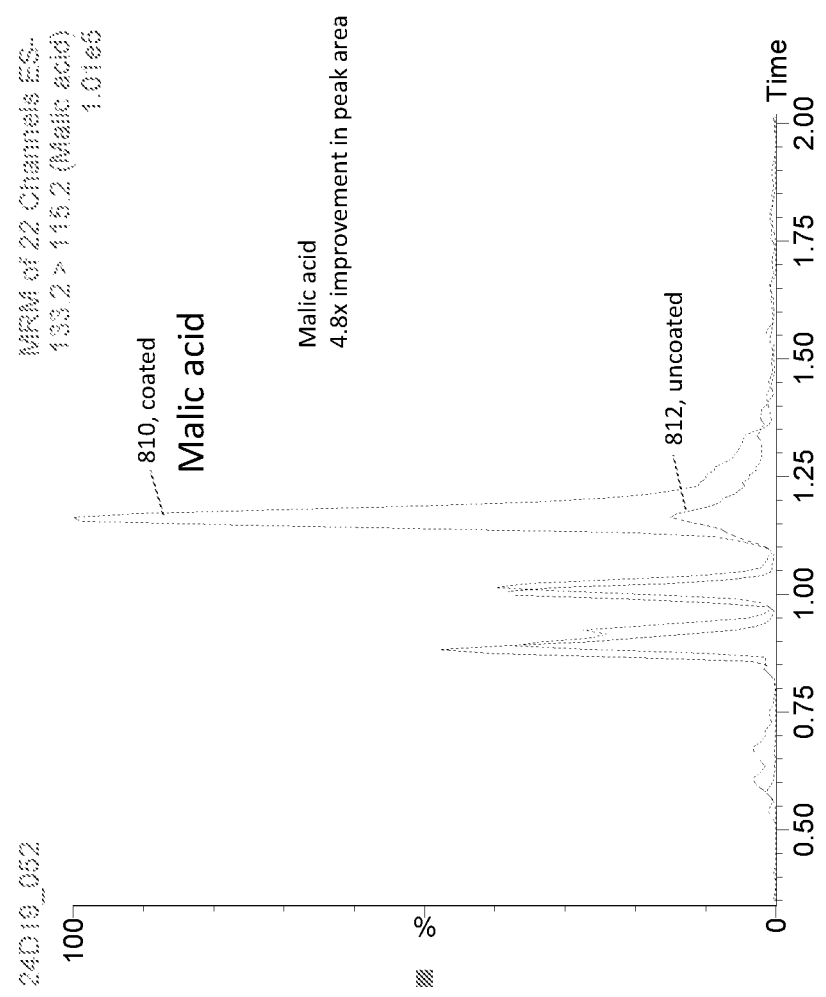
FIG. 8B is a graph showing the separation of malic acid with a C2 coated column (top line, 810) and an uncoated standard column (bottom line, 812).
Figure 8C:
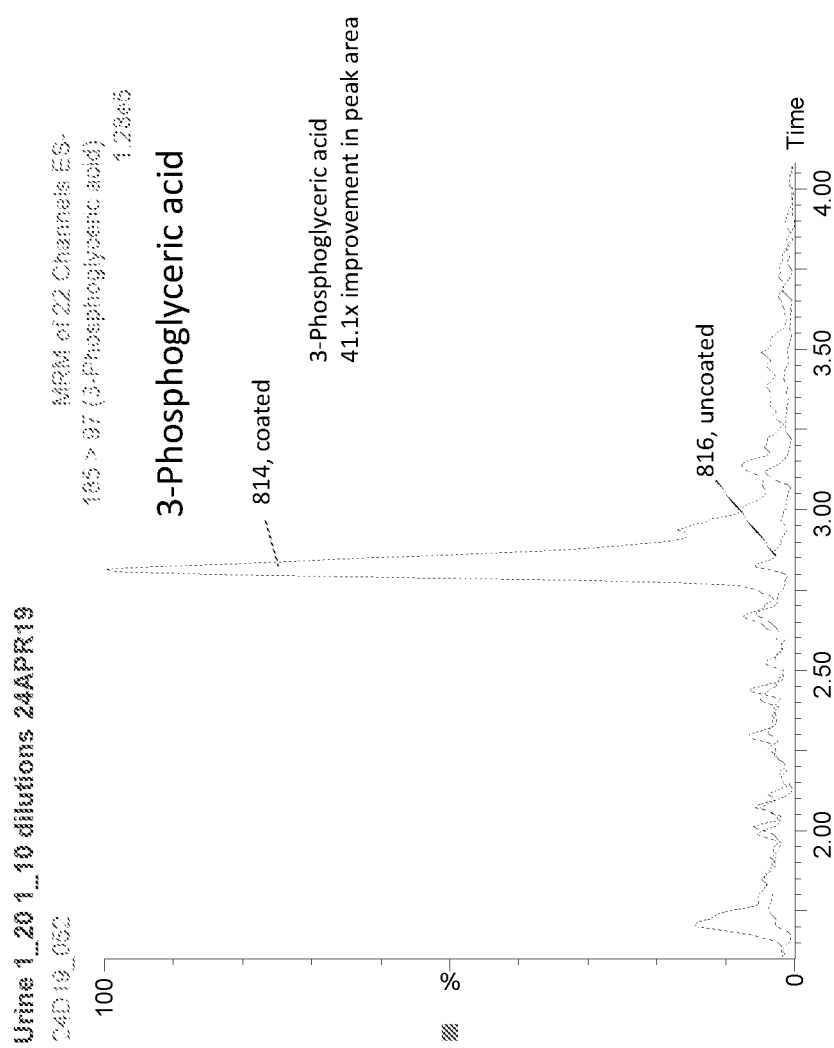
FIG. 8C is a graph showing the separation of 3-phosphoglyceric acid with a C2 coated column (top line, 814) and an uncoated standard column (bottom line, 816).

Even greater improvements are achieved in the separation of two other biological metabolites, malic acid and 3-phosphoglyceric acid. Both of these biological metabolites were separated utilizing uncoated and C2 coated CSH phenyl hexyl columns (2.1×100 mm, 1.7 micron). Example 15 illustrates the results of a malic acid separation. As shown in FIG. 8B a 4.8× improvement in peak area is achieve in utilizing a C2 coated column over the uncoated format (compare coated result 810 to uncoated result 812). Example 16 illustrates the results 3-phosphoglyceric acid separation. FIG. 8C shows a 41.1× improvement in peak area achieved by utilizing the C2 coated phenyl hexyl column versus an uncoated phenyl hexyl column (compare coated result 814 to uncoated result 816).

Examples 14-16 studied the metabolites in a matrix of human urine. The embodiments in examples 17-19 illustrate improvements of using a coated charged surface phenyl hexyl column when investigating differences in pooled matrices—i.e., urine samples pooled from a healthy patients and diseased patients (breast cancer). Metabolic analytes in a matrix of healthy urine, diseased urine, and pooled urine were studied. In examples 17-19, stock solutions of the analytes were prepared in ultrapure water at 50 mM, free acid. Stock solutions were prepared by pipetting 50 μL of each analyte followed by dilution with ultrapure water in a silanized sample vial to give final concentrations of 2.5 mM/analyte. Samples were stored at 4° C. Analytes were purchased from Sigma Aldrich (3-phosphoglyceric acid, 6-phosphogluconic acid, cis-aconitic acid, citric acid, fumaric acid, glutamic acid, glutamine, isocitric acid, itaconic acid, latic acid, malic acid, phosphoenolpyruvic acid and pyruvic acid. D-α-Hydroxyglutaric acid (2-hydroxyglutaric acid) analyte was purchased from Cayman Chemical.

Urine samples were defrosted on ice followed by 3× dilution with ultrapure water. The samples were then centrifuged for 10 minutes at 4° C. and 21,130 rcf. The supernatant was transferred to a silanized vial for analysis with 50 microliters of each breast cancer positive (BioIVT, Westbury, NY) and control urine sample added to a new vial for the experimental pool. Samples were analyzed immediately.

The samples were separated on an ACQUITY I-Class PLUS FTN binary chromatographic system with an ACQUITY PREMIER CSH Phenyl-Hexyl column (coated column) using a shallow gradient of 0.1% formic acid in water and ACN. The LC was connected to a Xevo G2-XS TOF mass spectrometer. The data was acquired and processed using MassLynx v4.2.

Figure 9:
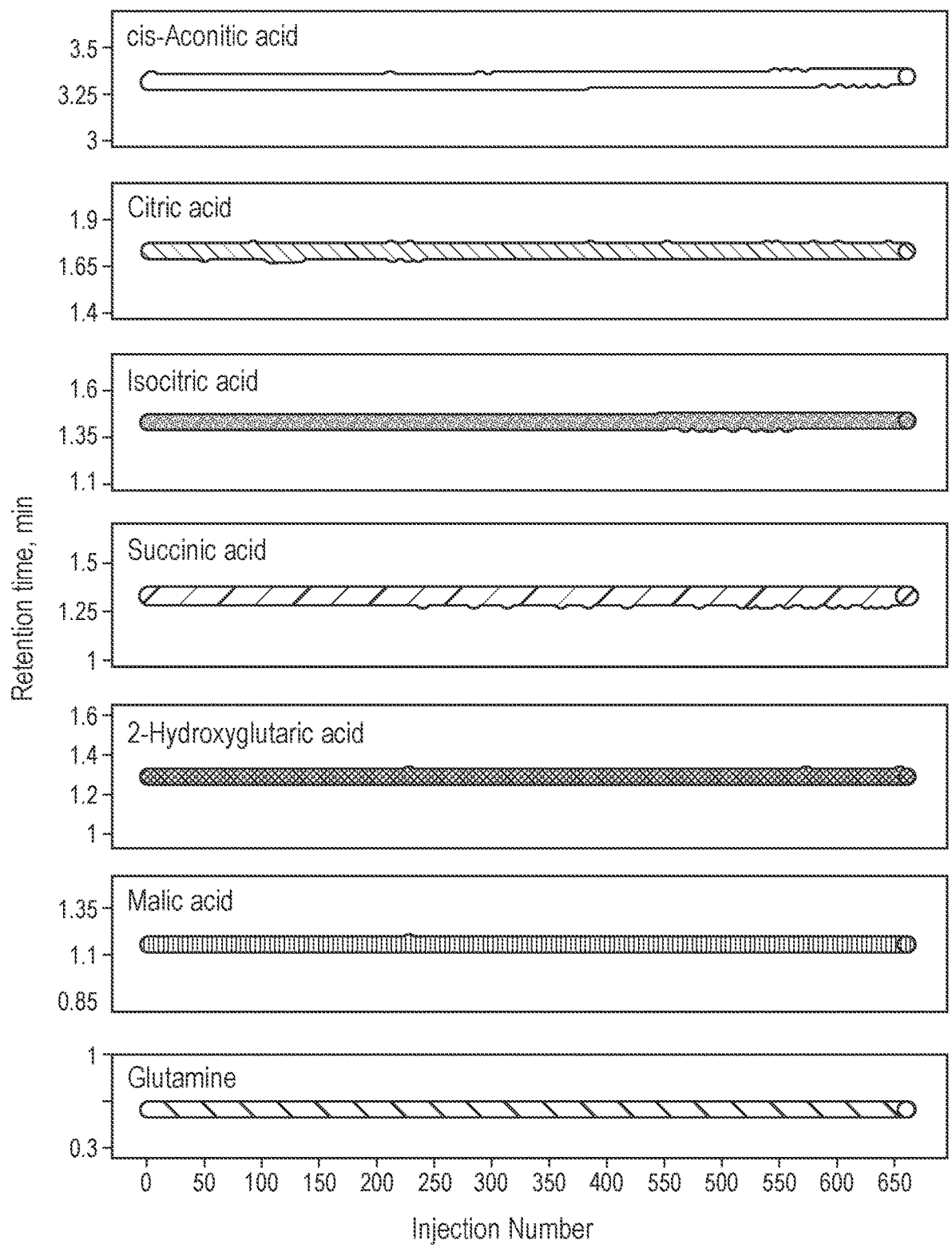
FIG. 9 illustrates retention time stability of organic acid analytes in a pooled urine sample over 462 injections.

To assess the robustness of the separation method (i.e., separation using a coated column with charged phenyl hybrid stationary phase) for biological samples a pooled urine sample was prepared and injected continuously over several days in Example 17. Analytes of interest included cis-aconitic acid, citric acid, isocitric acid, succinic acid, 2-hydroxyglutaric acid, malic acid, and glutamine. Retention time variation was assessed for compounds eluting across the run. The results of over 650 injections, representing nearly 5 days of continuous operation are shown in FIG. 9. Retention time variability ranged from 0.0-0.35% for the analytes.

Figure 10A:
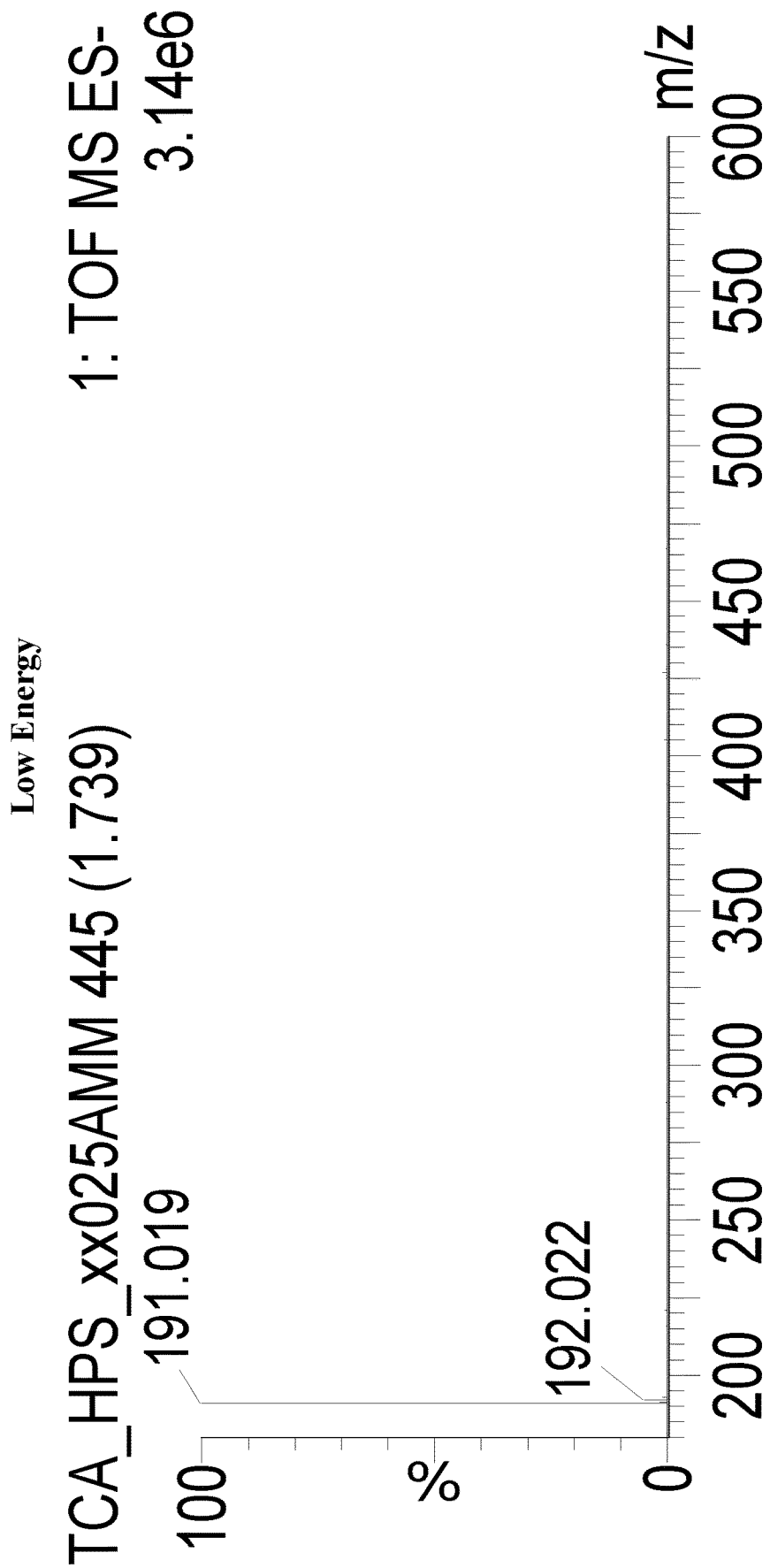
FIG. 10A and FIG. 10C are low and high energy spectra (respectively) of citric acid in a pooled urine sample separated using a C2 coated phenyl-hexyl column.
Figure 10B:
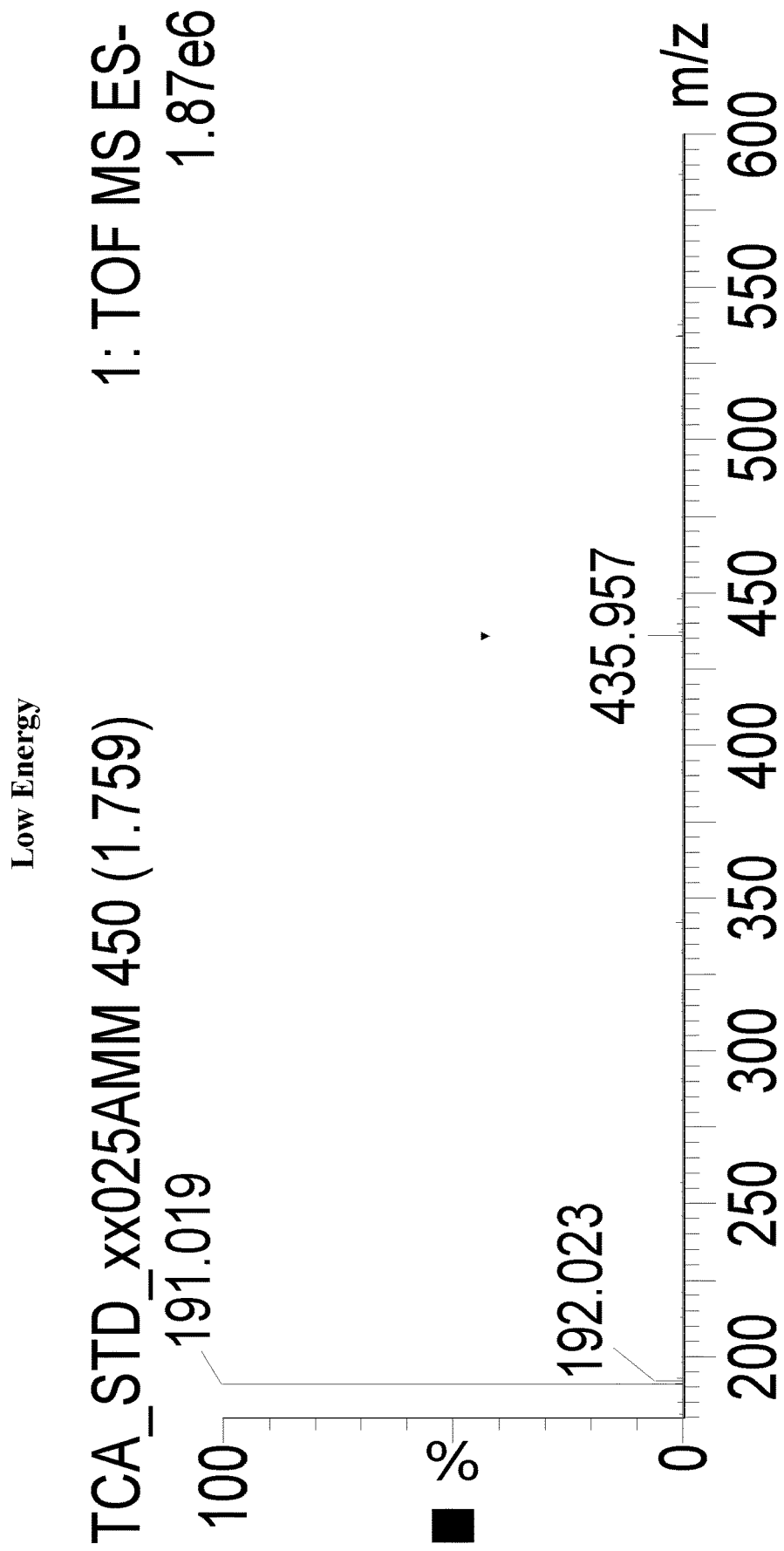
FIG. 10B and FIG. 10D are low and high energy spectra (respectively) of citric acid in the pooled urine sample separated using an uncoated (standard) phenyl-hexyl column.
Figure 10C:
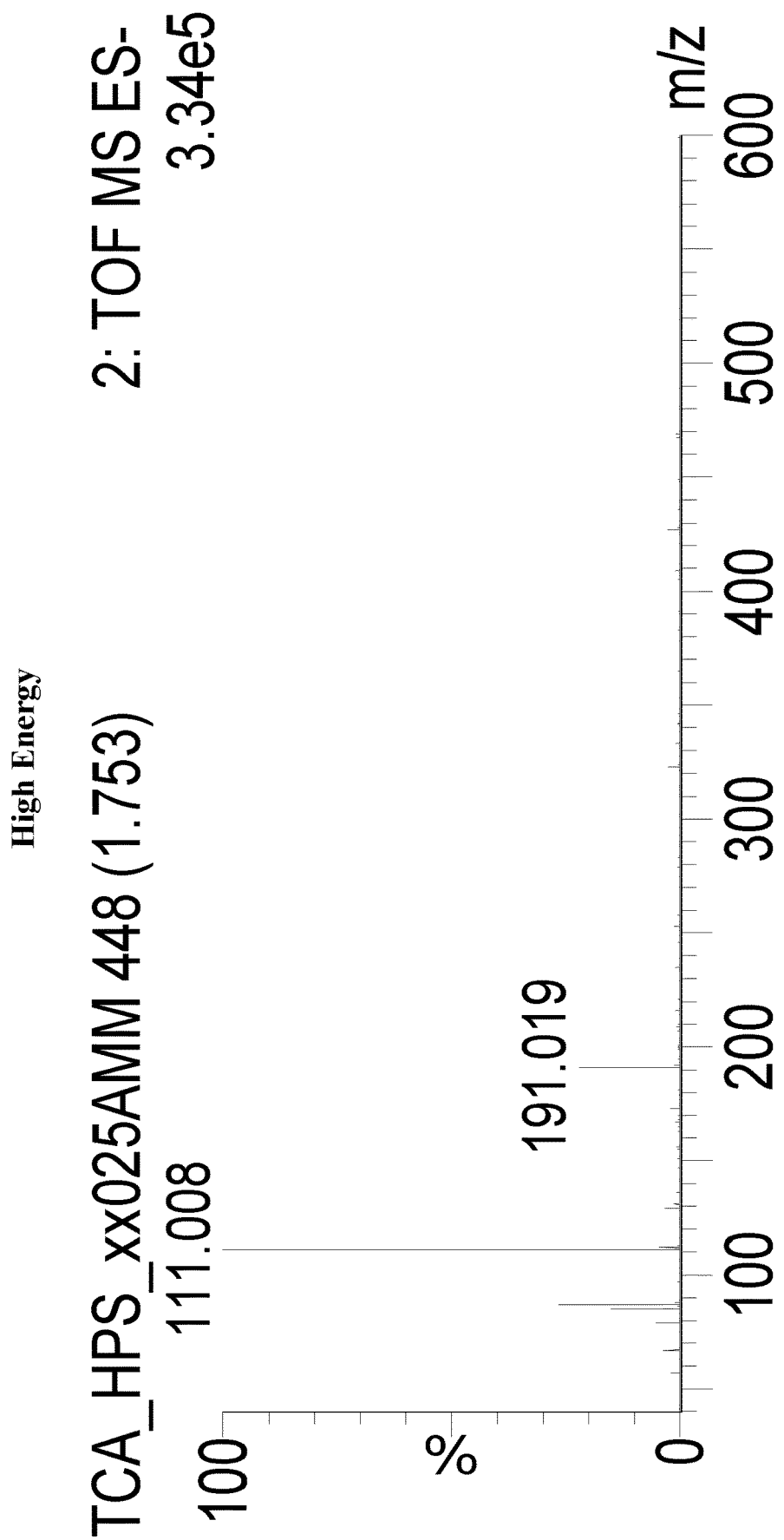
Figure 10D:
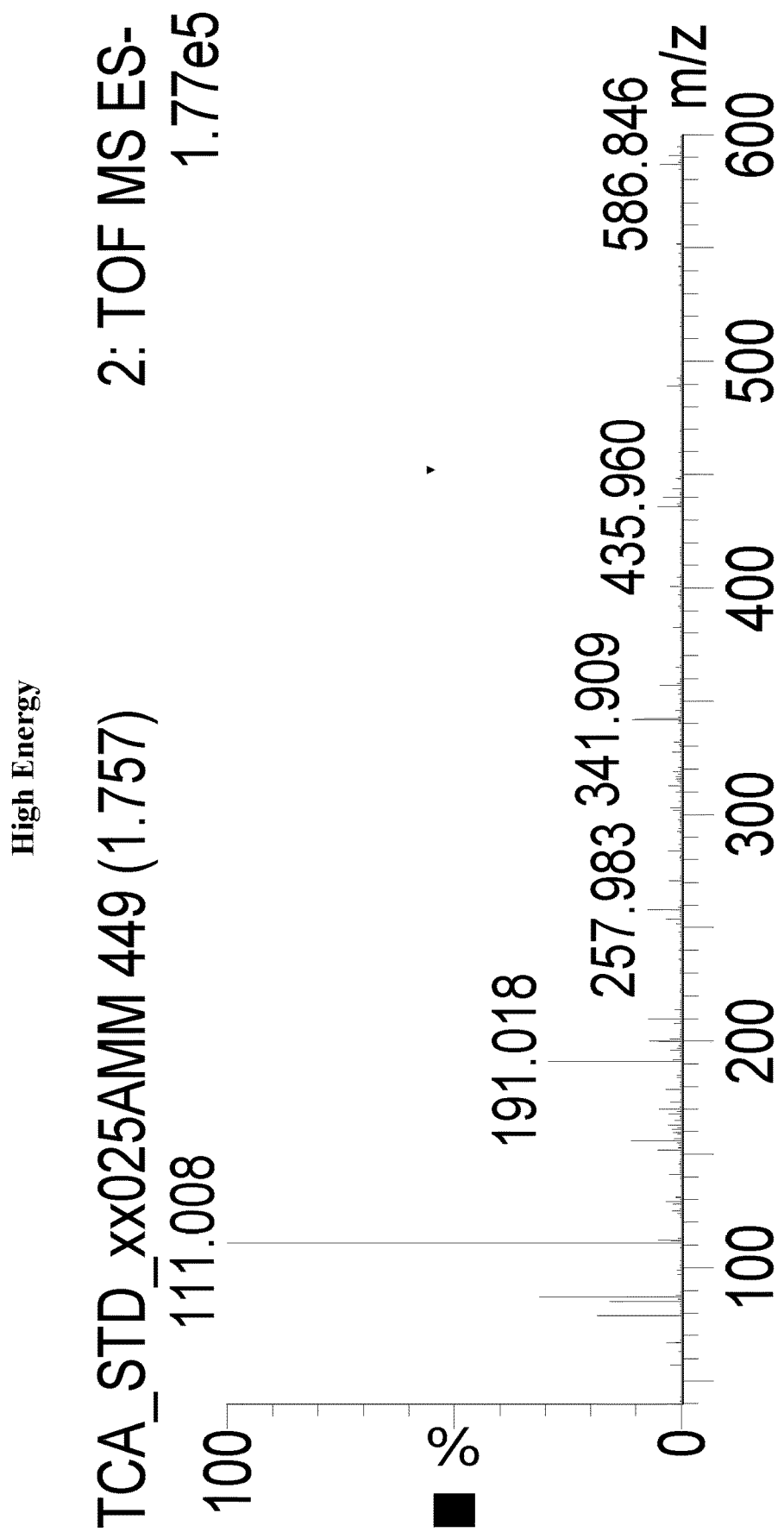

Well-known features of carboxylic acids and phosphorylated compounds are their ability to chelate or form complexes with metals and metal surfaces. During method development on a standard (uncoated) CSH phenyl-hexyl column, additional ions in the mass spectrum at the retention time of citric acid was noted. Using values found in literature searches and experimentation confirmed major complexation ion of $Fe(Cit)_2$ at 435.957 m/z. In Example 18, a C2 coated CSH phenyl-hexyl column was used in the separation of a pooled urine sample including citric acid. Using a C2 coated CSH phenyl-hexyl column appeared to eliminate or significantly reduce metal ion contamination resulting from the material present in the system. In particular, FIGS. 10A-D illustrate the reduction in intensity of ion seen when applying the coated CSH phenyl-hexyl column. FIGS. 10A and 10C provide low and high energy spectra of citric acid in the pooled urine sample as separated with a C2 coated CSH phenyl-hexyl column whereas FIGS. 10 B and 10D provide the low and high energy spectra of citric acid in the pooled urine sample separated using a standard (uncoated) CSH phenyl-hexyl column. It is apparent from first glance of these figures that the spectra obtained using the coated columns (FIGS. 10A and 10C) produces fewer interferences (less ion intensity) at both the low and high energy range than the spectra obtained from the uncoated column (FIGS. 10B and 10D). A benefit of the reduction in additional ions present in the high energy spectra was the increased fragmentation score, giving greater confidence in the data from the coated columns.

Figure 11A:
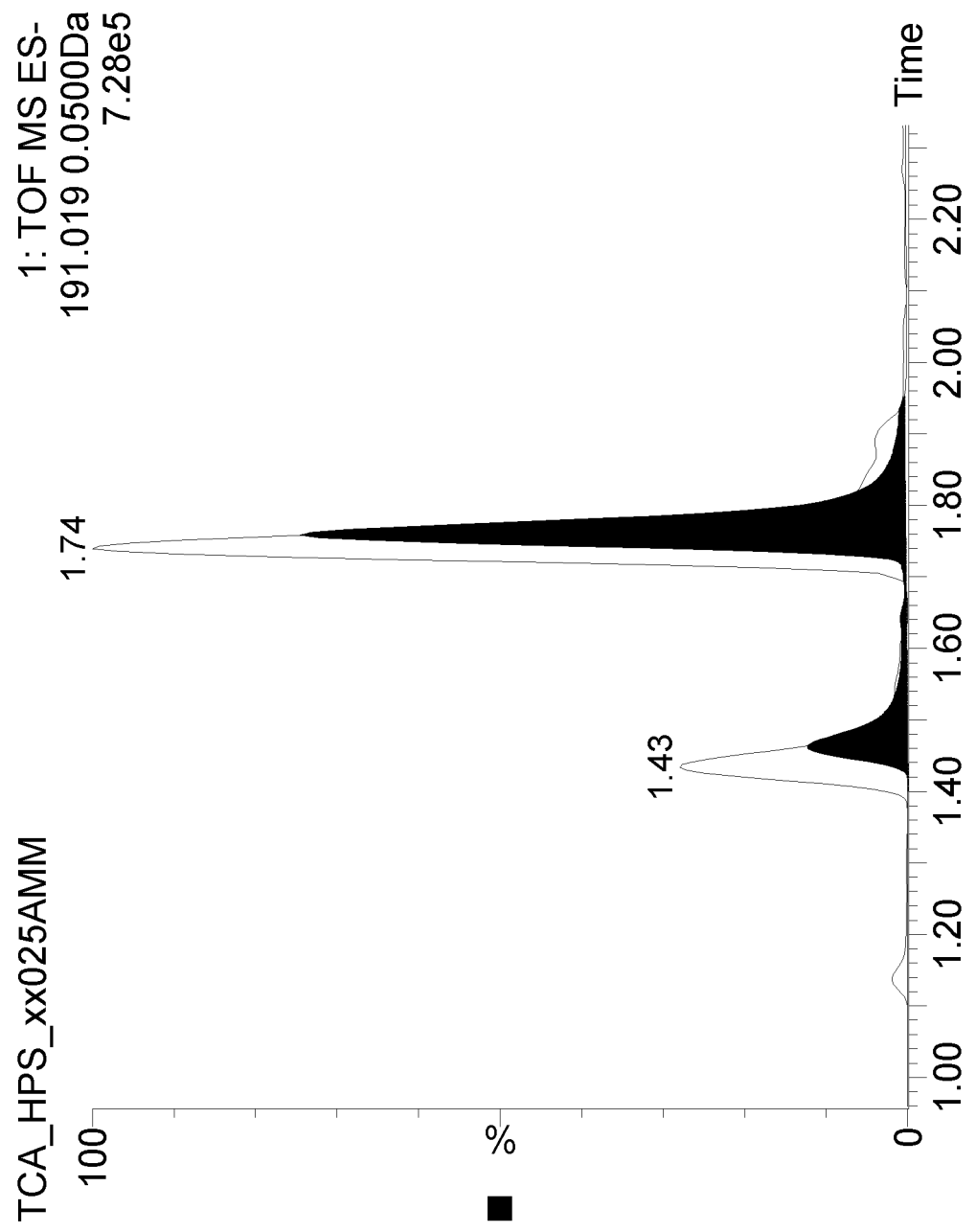
FIG. 11A is spectra showing peak recoveries from the pooled urine sample for isocitric and citric acid, respectively, malic acid (FIG. 11B), 2-hydroxyglutaric acid (FIG. 11C), and 3-phosphoglyceric acid (FIG. 11D) for a coated CSH phenyl-hexyl column versus a standard CSH phenyl-hexyl column (uncoated). The filled traces appearing in FIGS. 11A-D represent the peaks for the uncoated standard CSH phenyl-hexyl column, whereas the open peaks represent the data from the coated CSH phenyl-hexyl column.
Figure 11B:
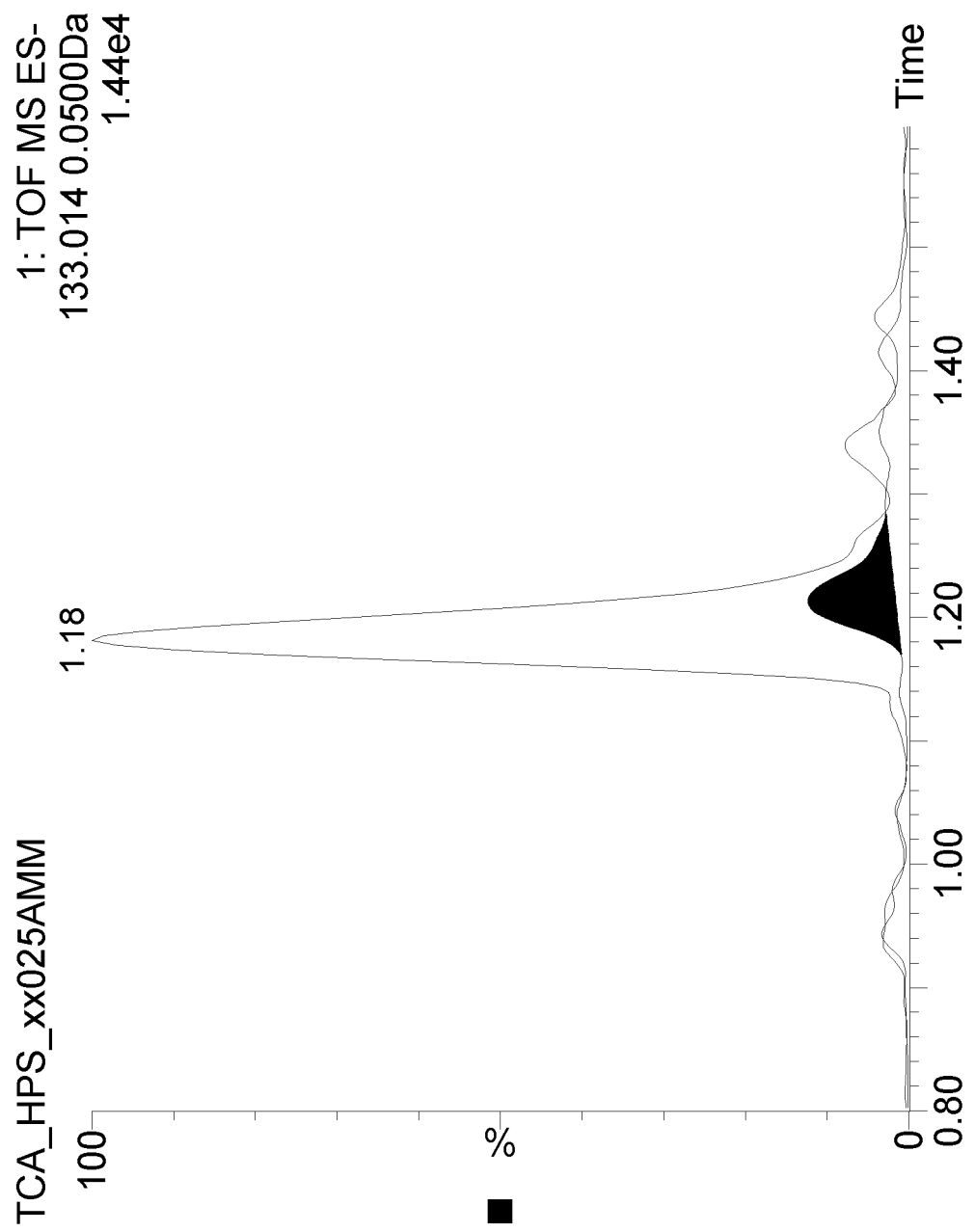
Figure 11C:
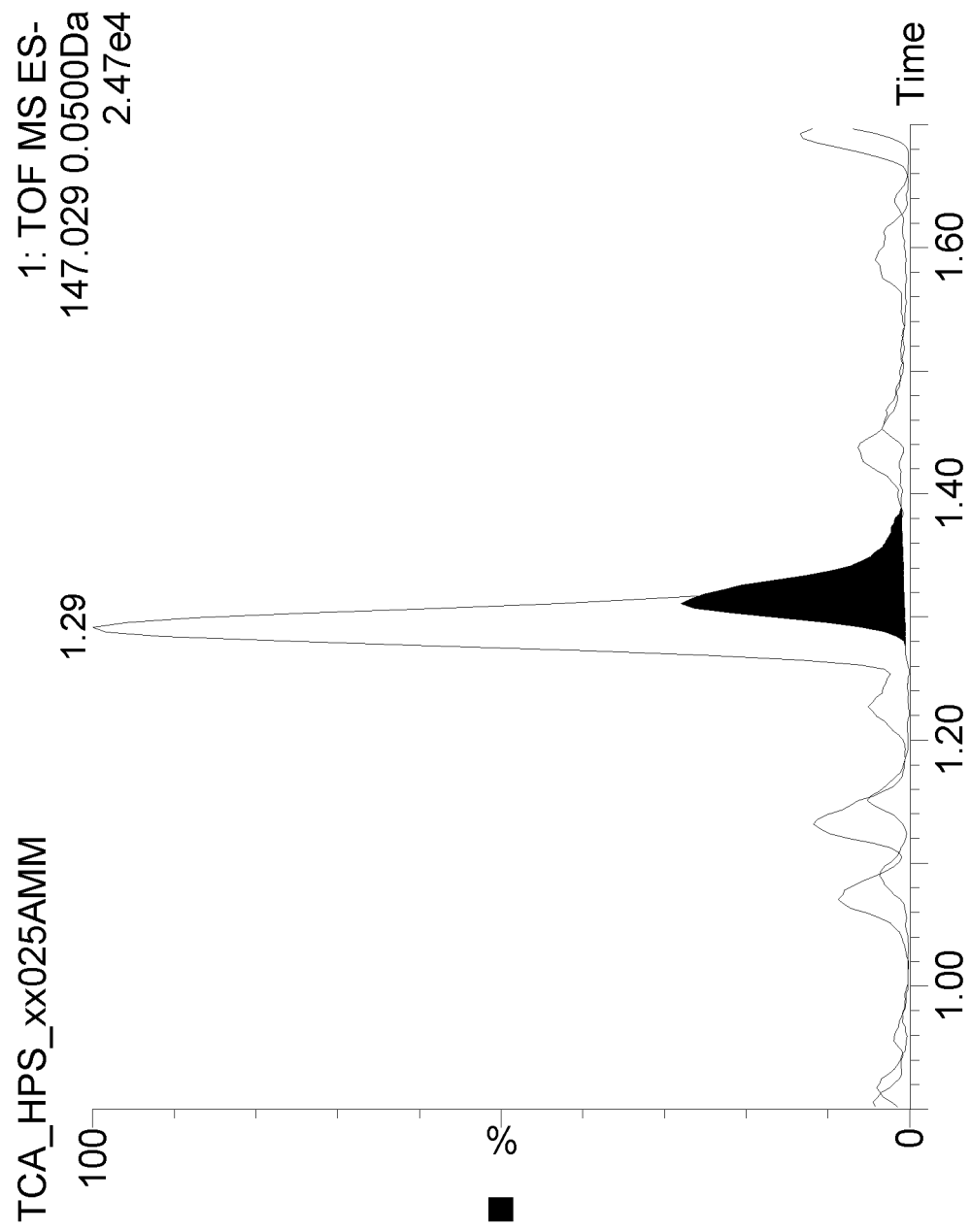
Figure 11D:
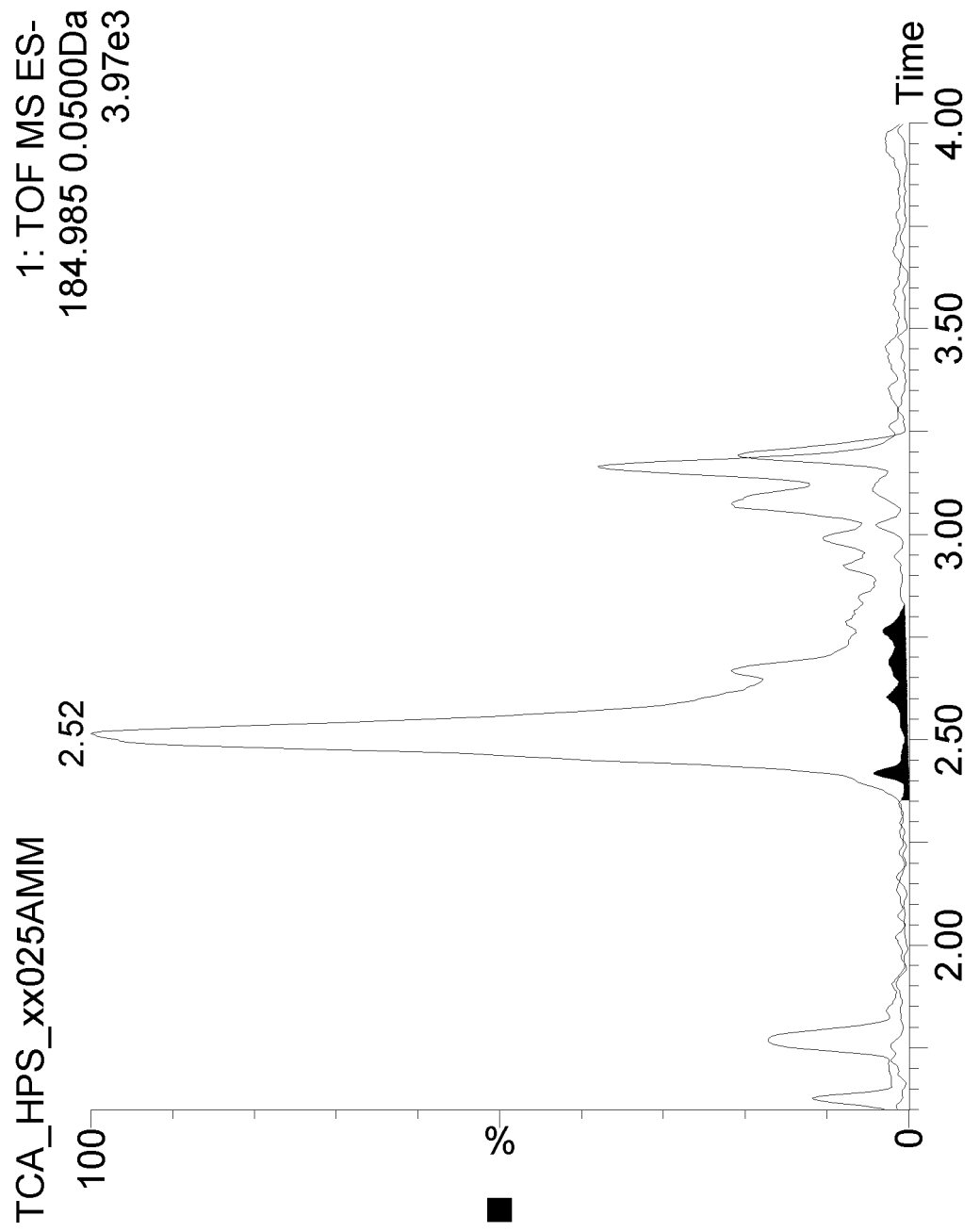

In Example 19, recovery of analytes was investigated in a comparative study between coated and standard (uncoated) CSH phenyl-hexyl columns. Unwanted interactions of the organic acids with metals also decrease analyte peak area recovery. This analyte loss can be especially troublesome for metabolites present in samples in low concentrations or containing phosphate moieties. The extracted chromatograms for isocitric and citric acids, malic acid, 2-hydroxyglutaric acid, and 3-phosphoglyceric acid from pooled urine sample are shown in FIGS. 11A-D. It is clear from these chromatograms that the peak area recoveries for the compounds are higher for the coated columns compared to the standard stainless steel column (filled trace). Recoveries for citric and isocitric acids were 1.4±0.04 and 2.1±0.11 times greater, respectively, on the coated column (FIG. 11A). In the case of malic acid (FIG. 11B) recovery was 5.8±0.31 times greater and for 2-hydroxyglutaric acid recovery is 3.5±0.11 times greater (FIG. 11C). In FIG. 11D, the greatest improvement was shown for 3-phosphoglyceric acid, which appeared to be greater than 100 times improved over the uncoated, standard column separation.

While examples 14-19 illustrate the improvement using a coated charged surface hybrid phenyl column over an uncoated column, the improvement is not limited CSH phenyl hexyl chemistries. Examples 1-13 show improvements in utilizing coated mixed mode—BEH C18 column chemistries. Other column chemistries are also possible and are in the scope of the technology.

Example 20 (C2C10 Coated Columns)

In the above examples, C2 coated hardware has been utilized to achieve improved peak area in separation of biomarkers, pharmaceutical drugs, biological metabolites, and genotoxic impurities. The C2 coated hardware is just one type of alkylsilyl coating that can be applied to wetted surfaces of the hardware. Other alkylsilyl coatings are possible, such as the coatings described in US Patent Publication No. US2019/0086371, and in particular C2C10 coatings (which are also further described in US 2019/0086371).

Figure 12:
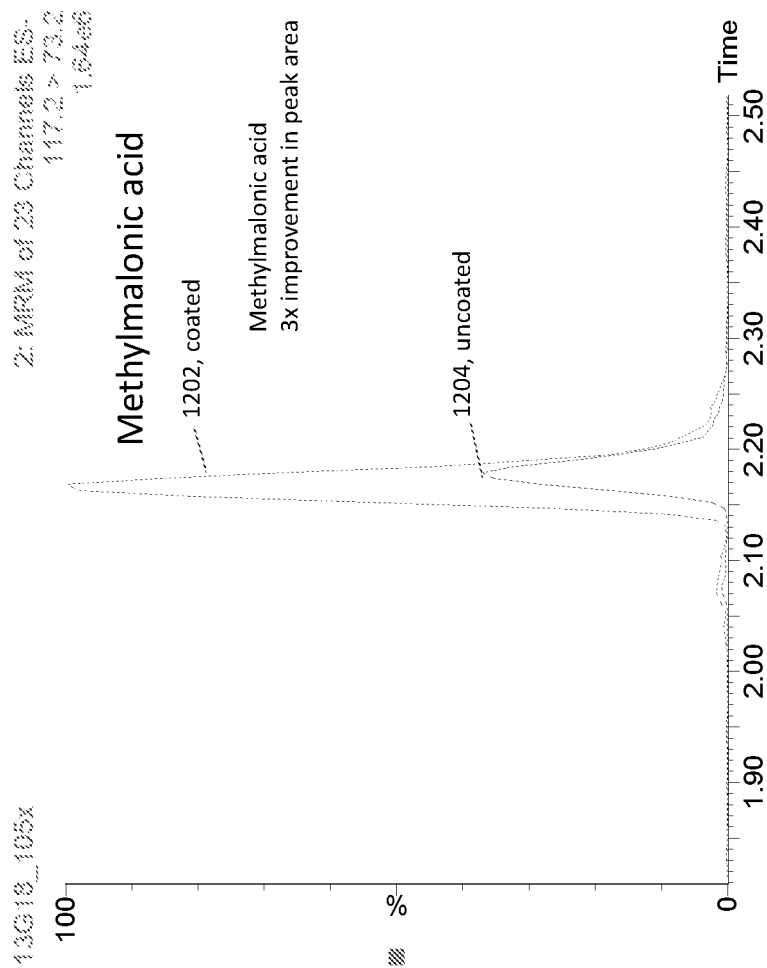
FIG. 12 is a graph showing the separation of methylmalonic acid with a C2C10 coated column (top line, 1202) and an uncoated standard column (bottom line, 1204).

Example 20 is provided to illustrate the results of separation of a clinical marker using hardware coated with C2C10. FIG. 12 illustrates the results of a methylmalonic acid separation. The samples separated in this example are extracted from human plasma and are spiked with a standard solution. In general, the range of this clinical marker is between 0 and 0.4 µM in blood. Thus, samples contain a very low (if any) concentration of methylmalonic acid. As shown in FIG. 12 a 3× improvement in peak area is achieve in utilizing a C2C10 coated column over the uncoated format. Compare coated results 1202 to uncoated results 1204.

Example Summary

FIGS. 13A-13E provide a compound summary chart listing the compounds separated, sample matrix, column chemistry, coating technology applied, and increase in peak area for coated hardware versus uncoated hardware. Results show an improvement of 1.3× to 41.1× for coated hardware, thereby demonstrating that alkylsilyl coated hardware provide a distinct advantage by limiting sample interactions with a metallic fluidic pathway.

FIGS. 14A-14F are bar graphs providing normalized data comparing peak area separation response for a number of different analytes on four different column types (BEH C18, HSS T3, CSH C18, and CSH Phenylhexyl). The normalized data compares the coated column (i.e., coated BEH C18 column) to an uncoated or standard version (i.e., uncoated, standard BEH C18 column). A column type with a value of 1 means that the coated column (column with a C2 coating) performed the same as (i.e., same peak area) as the uncoated column version for that particular analyte. A column type with a value greater than 1 means that the coated column version performed better than (i.e., increased peak area) the uncoated column version. Values of less than 1 indicate that the uncoated column performed better than the C2 coated column.

Figure 14A:
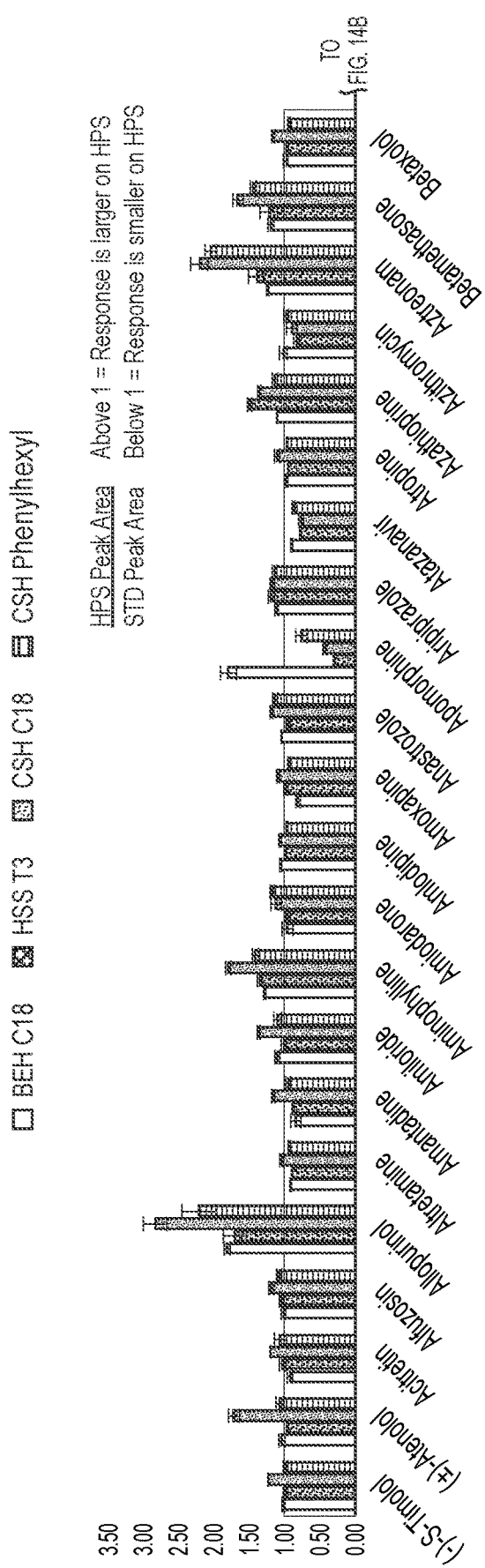
FIGS. 14A-14F are bar graphs providing normalized data comparing peak area separation response for a number of different analytes on four different column types (BEH C18, HSS T3, CSH C18, and CSH Phenylhexyl). The normalized data compares the coated column (i.e., coated BEH C18 column) to an uncoated or standard version (i.e., uncoated, standard BEH C18 column). A column type with a value of 1 means that the coated column (column with a C2 coating) performed the same as (i.e., same peak area) as the uncoated column version for that particular analyte. A column type with a value greater than 1 means that the coated column version performed better than (i.e., increased peak area) the uncoated column version. Values of less than 1 indicate that the uncoated column performed better than the C2 coated column.
Figure 14B:
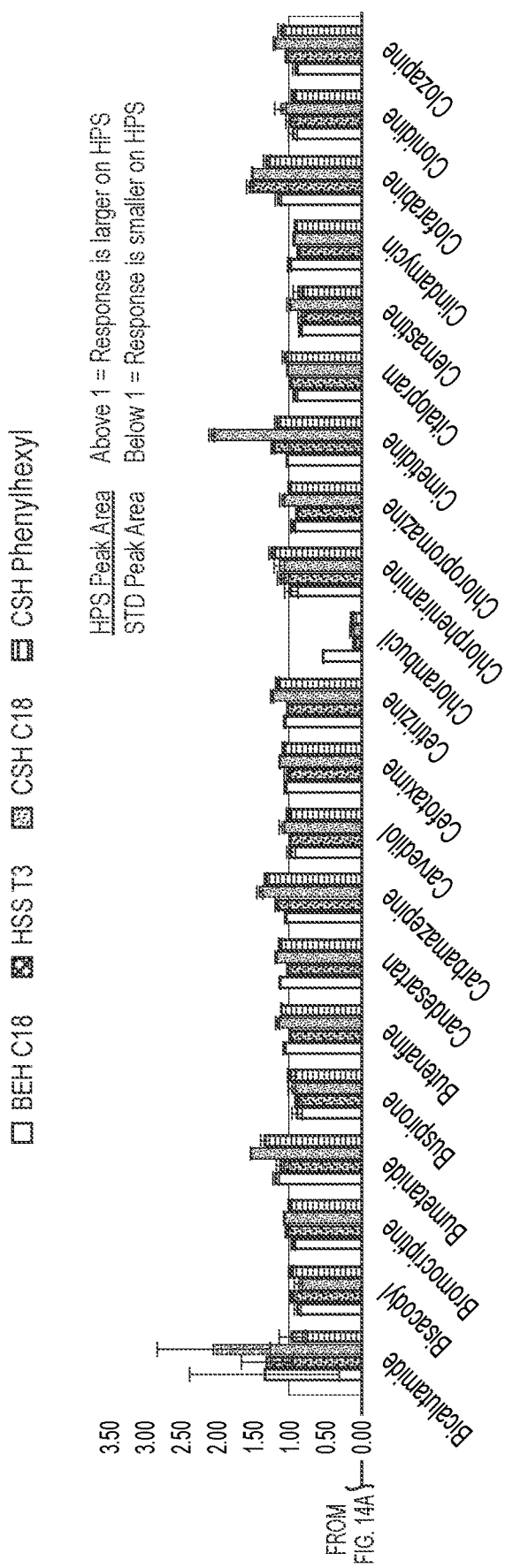
Figure 14C:
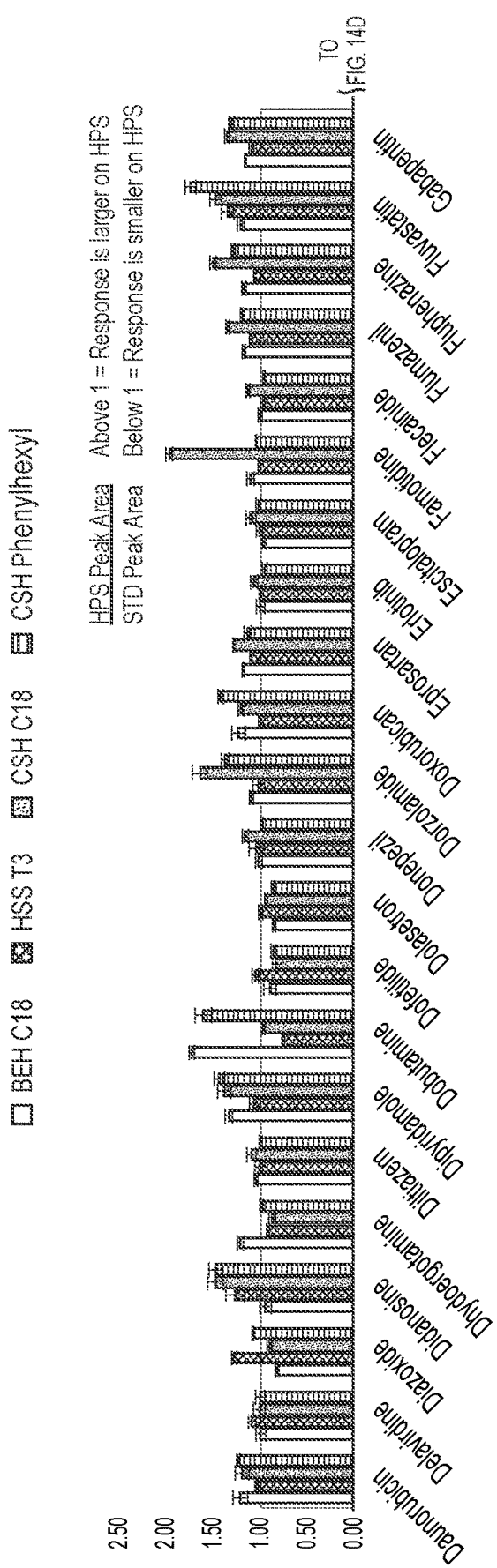
Figure 14D:
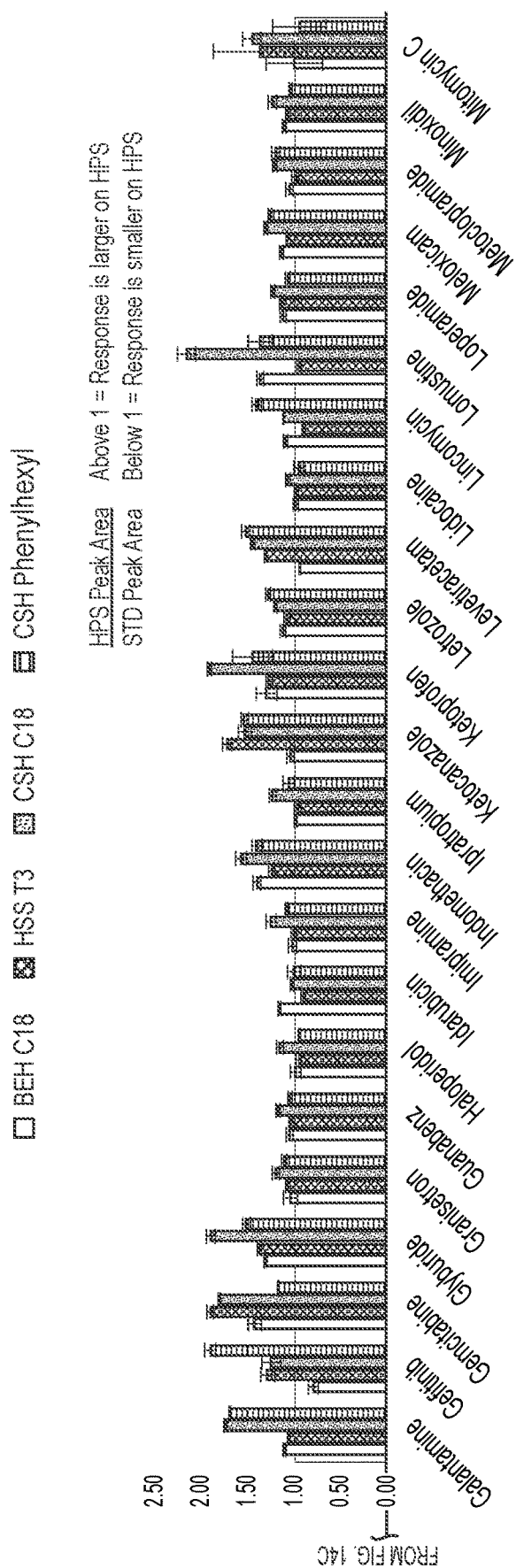
Figure 14E:
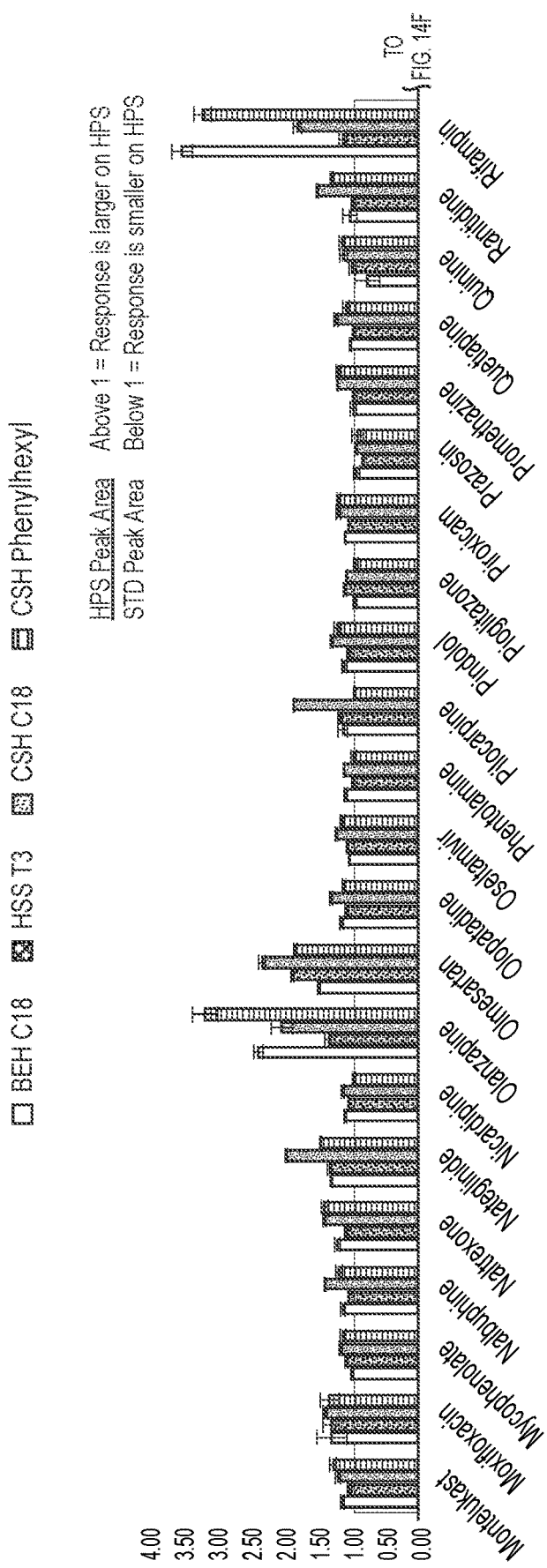
Figure 14F:
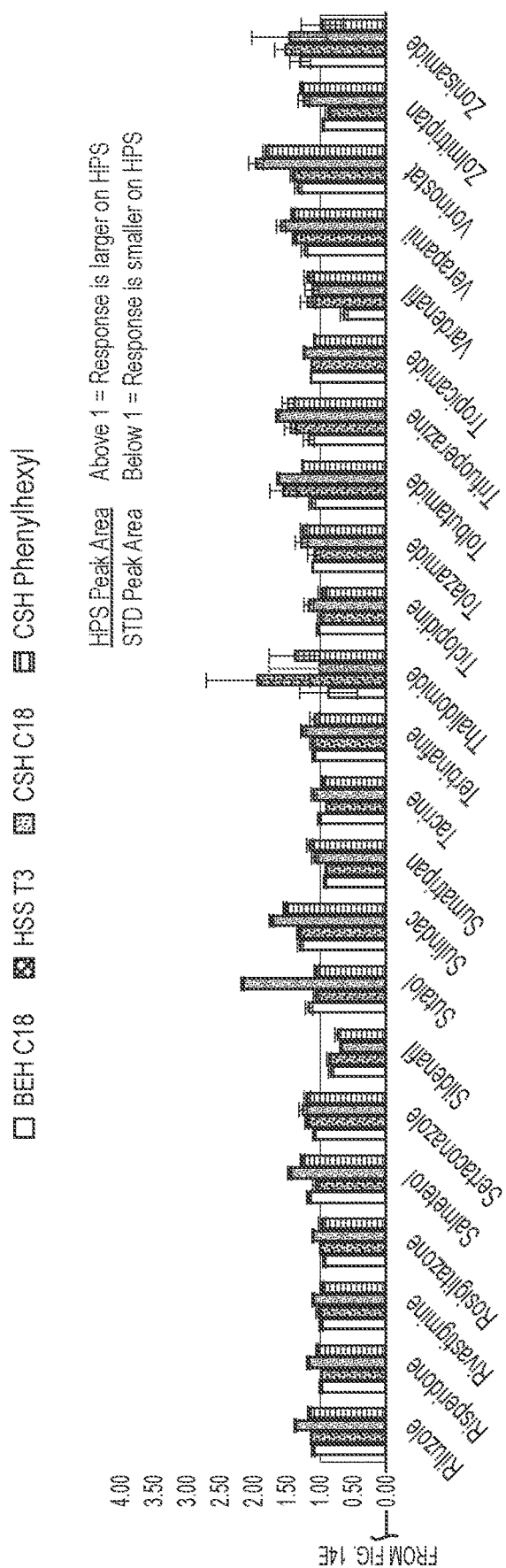

For example, in FIG. 14A, the results for Alfuzosin indicate that the C2 coated and uncoated versions of each of BEH C18, HSS T3, and CSH Phenylhexyl provided similar separation results with respect to peak area (i.e., value of the bars is approximately 1). This data set also indicates that for the separation and analysis of Alfuzosin using a C2 coated CSH C18 column provides an increased peak area in comparison to using an uncoated CSH C18 column (i.e., value of bar graph is 1.3).

Also shown in FIG. 14A are the results for Allopurinol. Each of the tested columns C2 coated versus uncoated BEH C18, HSS T3, CSH C18, and CSH Phenylhexyl show that an increase in peak area is provided by the C2 coated versions of these columns. That is the value of each bar graph is well above the value of 1.

The data provided in each of FIGS. 14A-14F illustrate that certain C2 coated column formats provide enhanced separation (increased peak area) as compared to their uncoated counterparts. In particular, there are a number of analytes that have been separated with C2 coated columns that provide a response of over 1.3 in comparison to their uncoated counterparts. Further, there are a number of combinations of C2 coated columns and analytes that provide a response of 1.5 or more (i.e., 1.5, 1.6, 1.75, 2, 2.5, 3, 3.5, or 4).

Figure 15B:
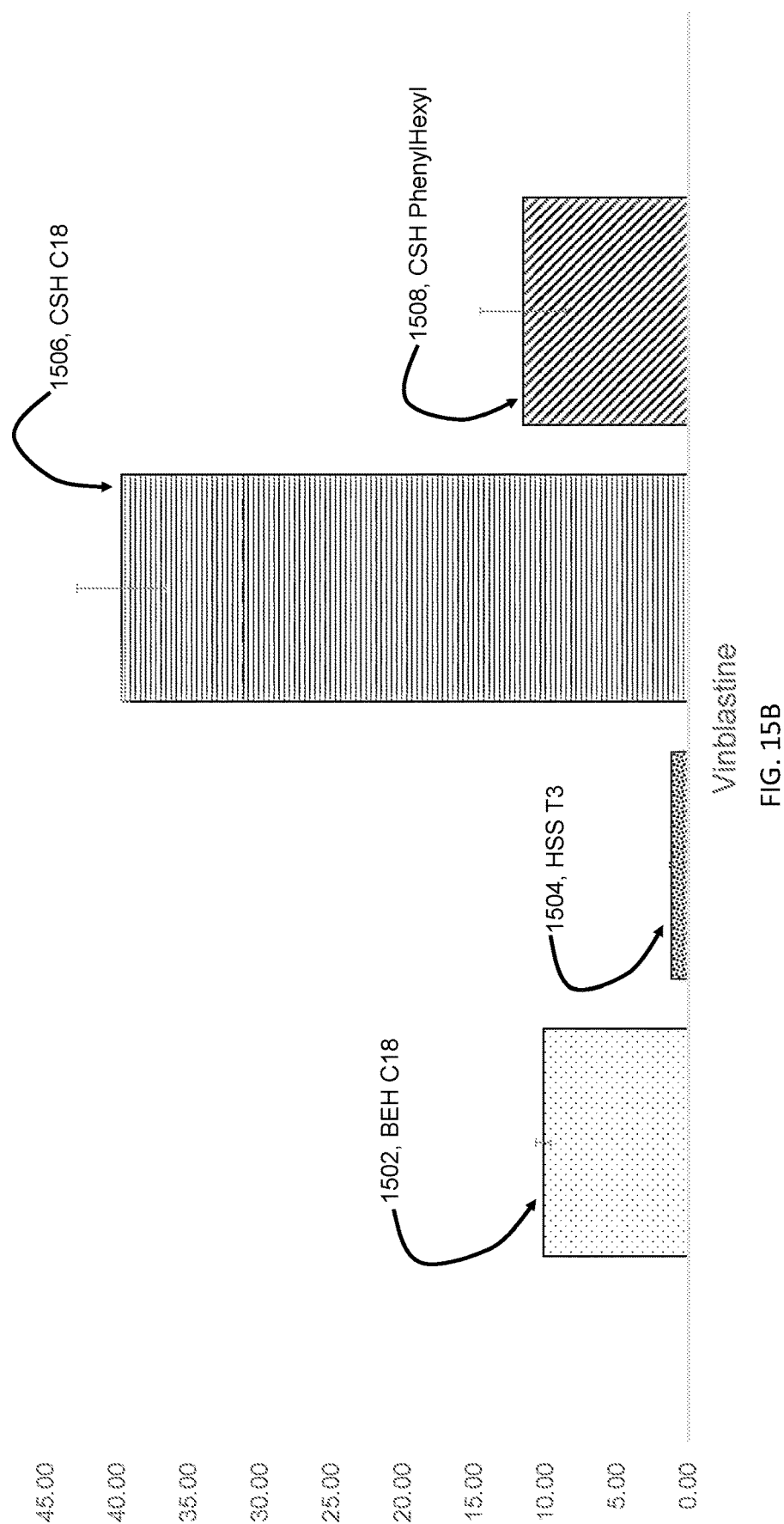
FIG. 15B is a bar graph illustrating peak area increase for C2 coated columns versus uncoated counterparts in the separation and analysis of vinblastine.

The amount of increased peak area for the analytes shown in FIGS. 14A-14F range between about 1.1× and about 4×. However, for certain analytes the amount of improvement and difference between C2 coated versions of the 4 different column types varies by a much larger amount. FIG. 15A provides the chemical structure of vinblastine, which is a chemotherapy medication. This analyte was separated using C2 coated and uncoated columns (i.e., C2 coated BEH C18 and uncoated BEH C18 columns; C2 coated HSS T3 and uncoated HSS T3 columns, C2 coated CSH C18 and uncoated CSH C18 columns, and C2 coated and uncoated CSH PhenylHexyl columns). The peak area for the separation results for each column type were obtained and the C2 coated column format was compared to the uncoated column format to obtain the data shown in bar graph form in FIG. 15B. As a reminder, a value of 1 indicates that the coated and uncoated column formats has substantially similar peak area. A value greater than 1 indicates that the C2 coated column format results provided an increased peak area versus its uncoated column counterpart. As shown in FIG. 15B, the separation results of vinblastine are greatly improved by using the C2 format. In addition, FIG. 15B shows a large difference in the increase versus column type. Specifically, the coated BEH C18 column (bar 1502) provided approximately a 10× increase in peak area over its uncoated counterpart. The coated HSS T2 (bar 1504) provided approximately a 2× increase in peak area over its uncoated counterpart. The coated CSH C18 (bar 1506) provided approximately 39.7× increase in peak area over its uncoated counterpart. And the coated CSH PhenylHexyl (bar 1508) provided approximately a 12× increase in peak area over its uncoated counterpart.

The above aspects and features of the present technology provide numerous advantages over the prior art. In some embodiments, there are numerous benefits incorporating the coating through the column (and in some embodiments through the entire fluidic pathway from sample reservoir to the detector) to define a LBS. For example, the present disclosure shows the benefits of increases in chromatographic peak area under LC/MS conditions that were observed in the range of 1.3× to 41.1× fold (or more) higher when comparing between columns with and without the LBS (i.e., the alkylsilyl coating). Many classes of compounds tested using the technology of the present disclosure showed benefits such as phosphorylated compounds, pharmaceutical drugs, biological metabolites, biomarkers, and genotoxic impurities.

What is claimed is:

1. A method of separating a sample comprising:
providing a chromatographic column having a metal flow path with an alkylsilyl coating on fluid exposed surfaces, the metal flow path with the alkylsilyl coating preventing the sample from binding to underlying metal surfaces;
injecting the sample onto the chromatographic column, wherein the sample comprises 2-hydroxyglutaric acid;
flowing the sample through the chromatographic column; and
separating the sample, wherein the alkylsilyl coating on the metal flow path of the chromatographic column increases a chromatographic peak area of the 2-hydroxyglutaric acid in the sample in comparison to an uncoated chromatographic column having fluid exposed metal surfaces by 3.5× or greater.

2. The method of claim 1, wherein the alkylsilyl coating is applied to a frit within the chromatographic column.

3. The method of claim 1, wherein the alkylsilyl coating is applied to wetted surfaces located upstream of the chromatographic column.

4. The method of claim 1, wherein the chromatographic column comprises a mix-mode chromatographic column.

5. The method of claim 1, wherein the chromatographic column comprises a phenyl-hexyl chromatographic column.

6. The method of claim 1, wherein the alkylsilyl coating is deposited from a vaporized source of bis (trichlorosilyl) ethane or bis (trimethoxysilyl) ethane.

7. A method of separating a sample comprising:
providing a chromatographic column having a metal flow path with an alkylsilyl coating on fluid exposed surfaces, the metal flow path with the alkylsilyl coating preventing the sample from binding to underlying metal surfaces;
injecting the sample onto the chromatographic column, wherein the sample comprises 3-phosphoglyceric acid;
flowing the sample through the chromatographic column; and
separating the sample, wherein the alkylsilyl coating on the metal flow path of the chromatographic column increases a chromatographic peak area of the 3-phosphoglyceric acid in the sample in comparison to an uncoated chromatographic column having fluid exposed metal surfaces by 5.8× or greater.

8. The method of claim 7, wherein the alkylsilyl coating is applied to a frit within the chromatographic column.

9. The method of claim 7, wherein the alkylsilyl coating is applied to wetted surfaces located upstream of the chromatographic column.

10. The method of claim 7, wherein the chromatographic column comprises a mix-mode chromatographic column.

11. The method of claim 7, wherein the chromatographic column comprises a phenyl-hexyl chromatographic column.

12. The method of claim 7, wherein the alkylsilyl coating is deposited from a vaporized source of bis (trichlorosilyl) ethane or bis (trimethoxysilyl) ethane.

13. The method of claim 7, wherein the alkylsilyl coating on the metal flow path of the chromatographic column increases a chromatographic peak area of the 3-phosphoglyceric acid in the sample in comparison to an uncoated chromatographic column having fluid exposed metal surfaces by 100× or greater.

\* \* \* \* \*